United States Patent
Wang et al.

(10) Patent No.: US 10,157,426 B1
(45) Date of Patent: Dec. 18, 2018

(54) DYNAMIC PAGINATION OF TAX RETURN QUESTIONS DURING PREPARATION OF ELECTRONIC TAX RETURN

(71) Applicant: Intuit Inc., Mountain View, CA (US)

(72) Inventors: Gang Wang, San Diego, CA (US); Kevin M. McCluskey, Carlsbad, CA (US); Jay J. Yu, Encinitas, CA (US); Alex G. Balazs, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 801 days.

(21) Appl. No.: 14/555,939

(22) Filed: Nov. 28, 2014

(51) Int. Cl.
  *G06F 17/22* (2006.01)
  *G07F 19/00* (2006.01)
  *G06Q 40/00* (2012.01)
  *G06F 17/30* (2006.01)

(52) U.S. Cl.
  CPC ....... *G06Q 40/123* (2013.12); *G06F 17/3053* (2013.01); *G06F 17/30554* (2013.01)

(58) Field of Classification Search
  CPC .... G06Q 40/123; G06Q 40/02; G06Q 20/207; G06Q 40/00; G06F 17/243
  USPC ...................... 705/31, 35, 36 T, 19
  See application file for complete search history.

(56) References Cited

U.S. PATENT DOCUMENTS

| | | | |
|---|---|---|---|
| 4,213,251 A | 7/1980 | Foundos | |
| 4,809,219 A | 2/1989 | Ashford et al. | |
| 5,006,998 A | 4/1991 | Yasunobu | |
| 5,495,607 A | 2/1996 | Pisello et al. | |
| 5,557,761 A | 9/1996 | Chan et al. | |
| 5,673,369 A | 9/1997 | Kim | |
| 5,742,836 A | 4/1998 | Turpin et al. | |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Notice of Allowance and Fee(s) Due dated May 5, 2017 in U.S. Appl. No. 14/206,682, (30pages).

(Continued)

*Primary Examiner* — Jason Borlinghaus
(74) *Attorney, Agent, or Firm* — DLA PIPER LLP (US)

(57) ABSTRACT

Computer-implemented methods, systems and articles of manufacture for rendering paginated interview screens that include arrangements of tax questions or topics representative of question or topic relevancy and that are selected and arranged based at least in part upon determined question or topic categorization and/or ranking. Different pagination structures may be utilized to visually indicate tax question or topic relevancy and to encourage or enable users of a tax return preparation application to answer more pertinent questions or topics before others, while also allowing the user to navigate or scroll questions or topics of paginated screens and to select questions or topics to answer or address at the user's discretion, without being restricted by a predetermined sequence of interview questions or hard-coded question-and-answer frameworks. Interview screen paginations and content thereof are dynamically updated as runtime data of the electronic tax return is received or updated.

42 Claims, 29 Drawing Sheets

(56) References Cited

U.S. PATENT DOCUMENTS

| | | |
|---|---|---|
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 * | 2/2004 | Miller ............... G06Q 20/207 705/1.1 |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 * | 5/2009 | Peak ................... G06Q 10/00 705/31 |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 * | 6/2010 | Leek ................... G06Q 10/10 705/31 |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 * | 3/2013 | Eftekhari ............. G06Q 40/123 705/31 |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 * | 5/2013 | Talan ................... G06F 17/243 705/19 |
| 8,473,880 B1 | 6/2013 | Bennett et al. |
| 8,478,671 B1 | 7/2013 | Tifford |
| 8,510,187 B1 * | 8/2013 | Dinamani ............ G06Q 40/10 705/31 |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 * | 8/2014 | Murray ................ G06F 3/0482 705/31 |
| 8,813,178 B1 | 8/2014 | Khanna |
| 8,838,492 B1 * | 9/2014 | Baker .................. G06Q 40/025 705/35 |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0065831 A1 * | 5/2002 | DePaolo ............. G06F 17/243 |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Marano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 * | 8/2006 | Stanley ............... G06Q 40/02 705/31 |
| 2006/0282354 A1 | 12/2006 | Varghese |
| 2006/0293990 A1 | 12/2006 | Schaub |
| 2007/0033116 A1 * | 2/2007 | Murray ................ G06F 17/243 705/31 |
| 2007/0033117 A1 * | 2/2007 | Murray ................ G06F 17/243 705/31 |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 * | 7/2007 | Humphrey ............ G06Q 40/10 705/36 T |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 * | 3/2008 | Murray ................ G06F 3/0482 715/777 |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |

(56) References Cited

U.S. PATENT DOCUMENTS

| | | |
|---|---|---|
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0131394 A1 | 5/2010 | Rutsch et al. |
| 2010/0153138 A1 | 6/2010 | Evans |
| 2011/0004537 A1* | 1/2011 | Allanson .............. G06Q 40/02 705/31 |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari .............. G06F 21/31 705/31 |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1* | 3/2016 | Goldman .............. G06Q 40/123 705/31 |
| 2016/0092993 A1 | 3/2016 | Ciaramitaro |
| 2016/0092994 A1 | 3/2016 | Roebuck et al. |
| 2016/0098804 A1* | 4/2016 | Mascaro .............. G06Q 40/123 705/31 |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

PCT International Search Report for PCT/US2016/044094, Applicant: Intuit Inc., Form PCT/ISA/210 and 220, dated Apr. 24, 2017 (5pages).

PCT Written Opinion of the International Search Authority for PCT/US2016/044094, Applicant: Intuit Inc., Form PCT/ISA/237, dated Apr. 24, 2017 (5pages).

PCT International Search Report for PCT/US2016/067839, Applicant: Intuit Inc., Form PCT/ISA/210 and 220, dated Apr. 25, 2017 (5pages).

PCT Written Opinion of the International Search Authority for PCT/US2016/067839, Applicant: Intuit Inc., Form PCT/ISA/237, dated Apr. 26, 2017 (12pages).

Amendment dated May 3, 2017 in U.S. Appl. No. 14/462,411, filed Aug. 18, 2014, (5pages).

Response dated May 15, 2017 in U.S. Appl. No. 14/448,962, filed Jul. 31, 2014, (30pages).

Office Action dated May 15, 2017 in U.S. Appl. No. 14/462,345, filed Aug. 18, 2014, (57pages).

Office Action dated May 15, 2017 in U.S. Appl. No. 14/555,902, filed Nov. 28, 2014, (8pages).

Office Action dated May 2, 2017 in U.S. Appl. No. 14/698,733, filed Apr. 28, 2015, (31pages).

http://en.wikipedia.org/wiki/Dependency_grammar#Semantic_dependencies, printed Mar. 11, 2014.

http://www.webopedia.com/TERM/L/loose_coupling.html, printed Mar. 11, 2014.

http://en.wikipedia.org/wiki/Loose_coupling, printed Mar. 11, 2014.

www.turbotax.com, printed Mar. 11, 2014.

https://turbotax.intuit.com/snaptax/mobile/, printed Mar. 11, 2014.

http://www.jboss.org/drools/drools-expert.html, printed Mar. 11, 2014.

http://en.wikipedia.org/wiki/Drools, printed Mar. 11, 2014.

http://en.wikipedia.org/wiki/Declarative_programming, printed Mar. 11, 2014.

http://www.wisegeek.com/what-is-declarative-programming.htm, printed Mar. 11, 2014.

http://docs.jboss.org/drools/release/5.3.0.Final/drools-expert-docs/html/ch01.html, printed Mar. 11, 2014.

http://quicken.intuit.com/support/help/tax-savings/simplify-tax-time/INF24047.html, updated Jul. 25, 2013, printed Jun. 24, 2014 (11 pages).

http://quicken.intuit.com/support/help/income-and-expenses/how-to-assign-tax-form-line-items-to-a-category/GEN82142.html, updated Aug. 11, 2011, printed Jun. 24, 2014 (2 pages).

http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).

NY State Dep of Taxation, NY State Personal Income Tax MeF Guide for Software Developers, 2012, NY State.

Restriction Requirement dated May 22, 2015 in U.S. Appl. No. 14/097,057, filed Dec. 4, 2013, inventor: Gang Wang.

Response dated Jun. 30, 2015 in U.S. Appl. No. 14/097,057, filed Dec. 4, 2013, inventor: Gang Wang.

Office Action dated Oct. 2, 2015 in U.S. Appl. No. 14/097,057, filed Dec. 4, 2013, inventor: Gang Wang.

Response dated Feb. 29, 2016 in U.S. Appl. No. 14/097,057, filed Dec. 4, 2013, inventor: Gang Wang.

(56) References Cited

OTHER PUBLICATIONS

Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.

Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
PCT International Search Report for PCT/US2017/062777, Applicant: Intuit Inc., Form PCT/ISA/210 and 220, dated: Feb. 21, 2018 (5pages).
PCT Written Opinion of the International Search Authority for PCT/US2017/062777, Applicant: The Regents of the University of California, Form PCT/ISA/237, dated: Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).

(56) References Cited

OTHER PUBLICATIONS

Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).

(56) References Cited

OTHER PUBLICATIONS

Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 168432821-1217, (1page).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Vanderbilt University, "Free tax prep help available for Vanderbilt employees", Feb. 6, 2014, Vanderbilt University, p. 1-3.
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).

(56) References Cited

OTHER PUBLICATIONS

Office Action dated Aug. 25, 2017 in U.S. Appl. No. 14/673,555, (65pgs.).
Office Action dated Sep. 28, 2017 in U.S. Appl. No. 14/701,149, (71pgs.).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 14, 2017 in U.S. Appl. No. 14/530,159, (41pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).

* cited by examiner

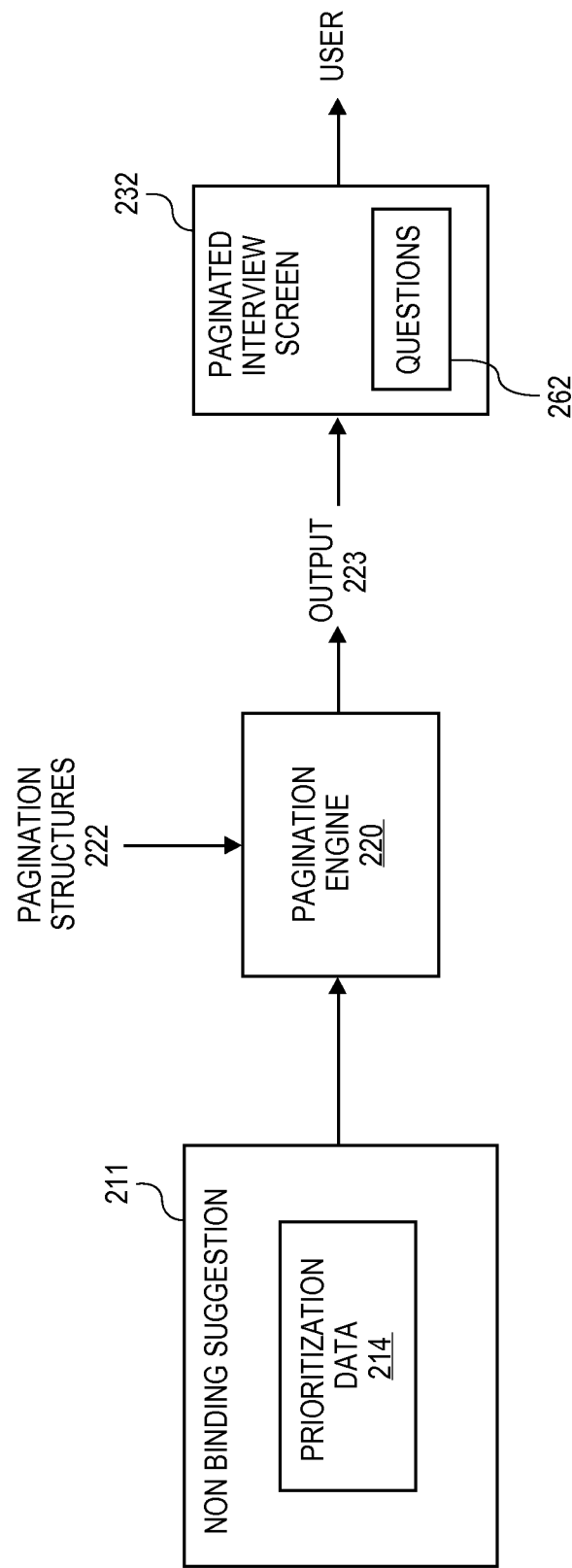

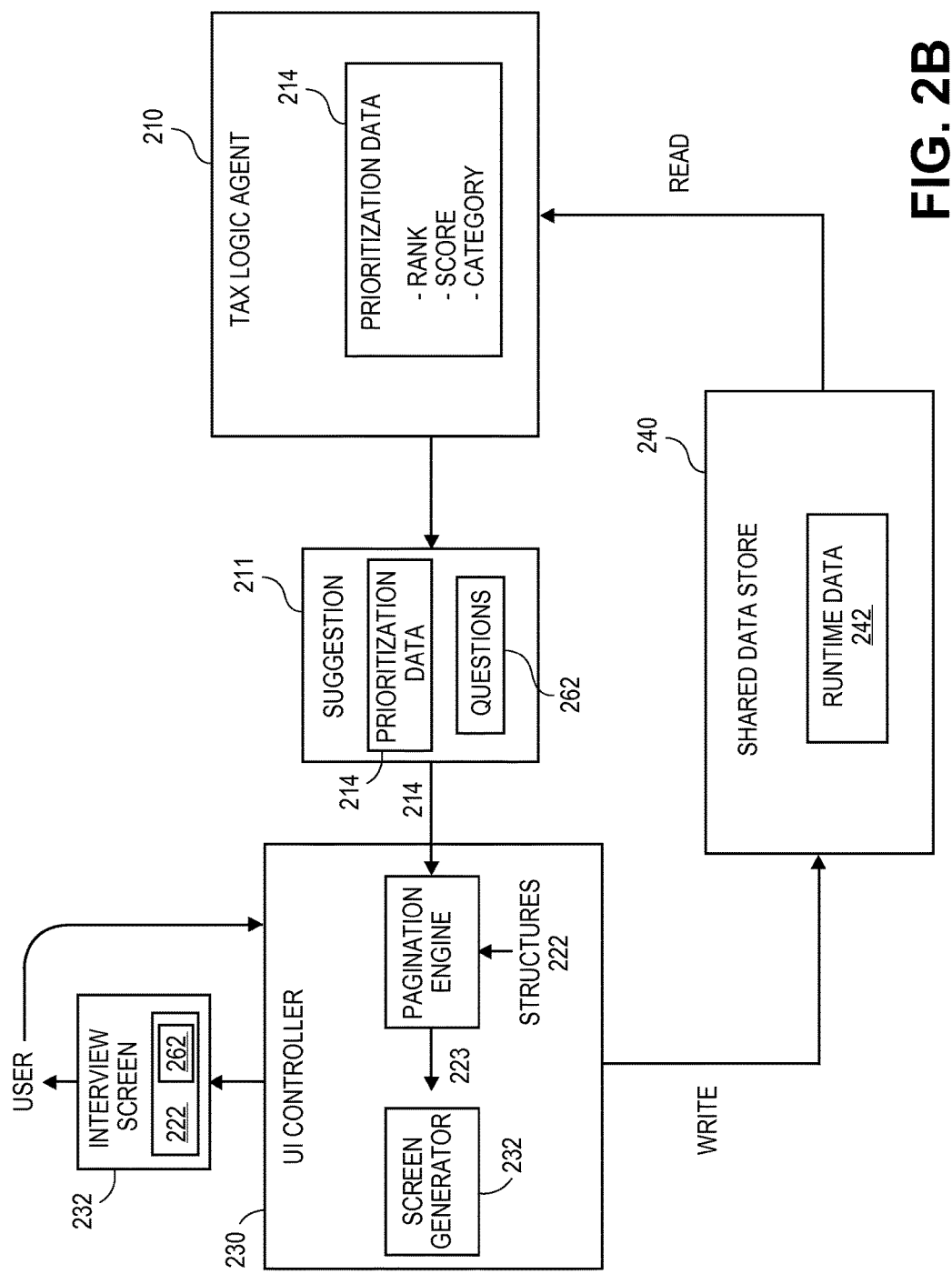

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 9B

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | Y | N | Y | Yes |
| R4 | N | Y | ? | ? | N | N | ? | Yes |
| R5 | N | N | ? | N | ? | N | ? | Yes |

460 — Columns (Questions 462); (Rows) (Rules 461)

Cross Out Since Answer to Question A is "yes" 1010

FIG. 10

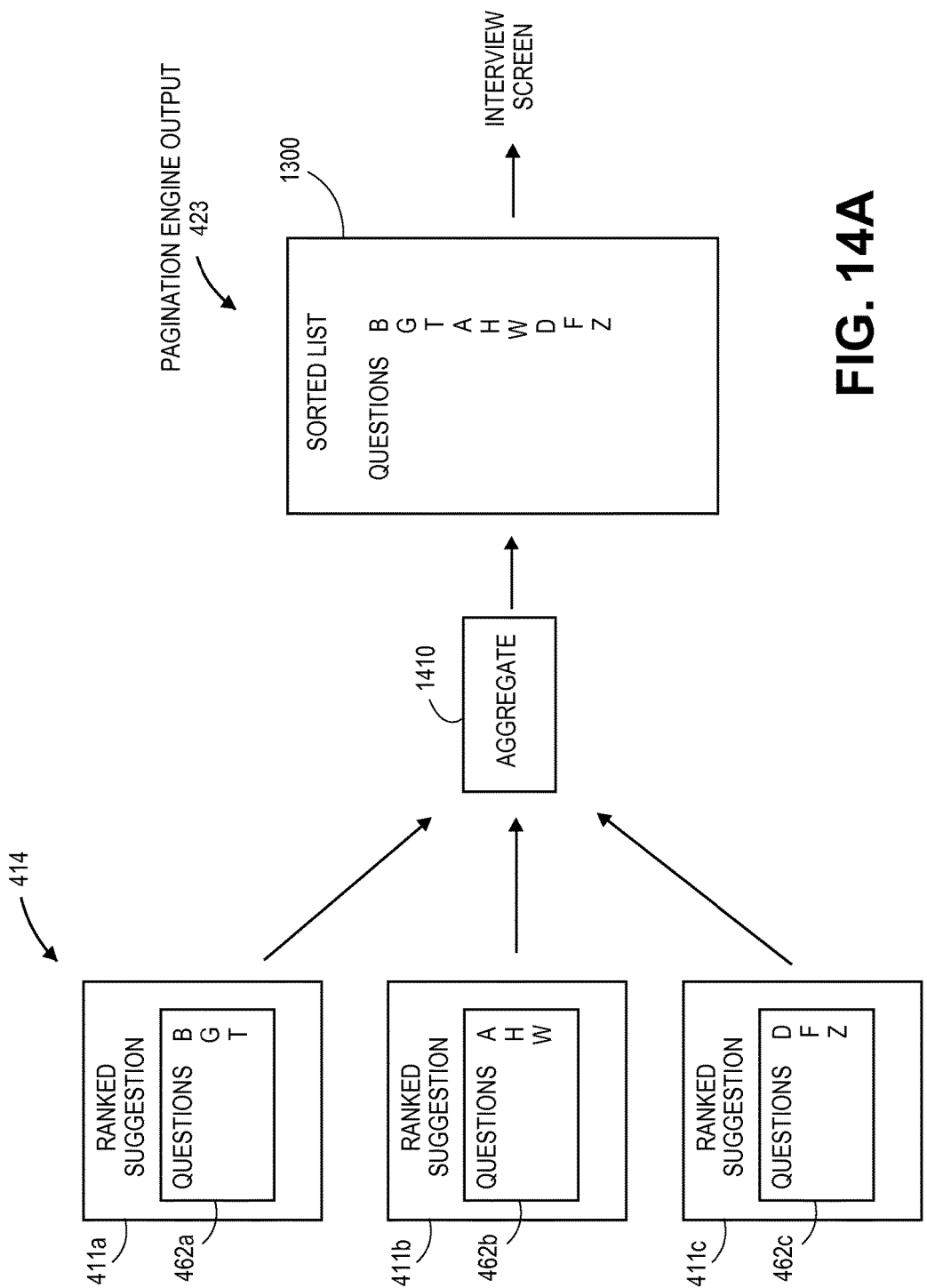

US 10,157,426 B1

DYNAMIC PAGINATION OF TAX RETURN QUESTIONS DURING PREPARATION OF ELECTRONIC TAX RETURN

CROSS-REFERENCE TO RELATED APPLICATIONS

This application is related to U.S. application Ser. No. 14/462,058, filed Aug. 18, 2014, entitled "COMPUTER IMPLEMENTED METHODS SYSTEMS AND COMPUTER PROGRAM PRODUCTS FOR RANKING NON-BINDING SUGGESTIONS DURING PREPARATION OF ELECTRONIC TAX RETURN, U.S. application Ser. No. 14/448,678, filed Jul. 31, 2014, entitled "COMPUTER IMPLEMENTED METHODS SYSTEMS AND ARTICLES OF MANUFACTURE FOR PREPARING ELECTRONIC TAX RETURN WITH ASSUMPTION DATA; and U.S. application Ser. No. 14/461,982, filed Aug. 18, 2014, entitled COMPUTER IMPLEMENTED METHODS SYSTEMS AND COMPUTER PROGRAM PRODUCTS FOR CANDIDATE QUESTION SCORING AND RANKING DURING PREPARATION OF ELECTRONIC TAX RETURN, the contents of all of which are incorporated herein by reference as though set forth herein in full.

SUMMARY

Embodiments are related to how tax return questions or topics are categorized or ranked and rendered within a paginated screen or structure that is displayed to a user of a tax return preparation application in which tax logic is decoupled from interview screens.

Certain embodiments are related to a pagination engine that is used to generate a screen with tax questions or topics that factors categorization, score and/or ranking data.

Certain embodiments are related to dynamically adjusting a paginated structure and content thereof as runtime data of the electronic tax return is updated or changed.

Certain embodiments are related to generating a paginated structure with tabs that can be selected by the user of the tax return preparation application to view questions or topics that are categorized based on tab categories.

Certain embodiments are related to allowing users to submit search requests that narrow the scope of tax questions or topics and adjusting a paginated structure and content thereof based at least in part upon the search request.

Certain other embodiments are related to identifying and distinguishing questions that are that are required and those that may be required.

Certain other embodiments are related to ranking questions and generating an interview screen that is structured based on the question ranking that is based at least in part upon a combination of tax logic, which may be expressed in a completion graph or decision table, and another data source including data indicative of how likely certain questions are relevant to a taxpayer, such as statistical data or results generated by execution of a predictive model.

One embodiment is related to a computer-implemented method of paginating questions presented to a user of a tax return preparation application during preparation of an electronic tax return. The method comprises a tax logic agent reading first runtime data of the electronic tax return from a data store that is shared with a user interface controller, and selecting candidate topics or questions based at least in part upon the runtime data. The method further comprises the tax logic agent generating a plurality of non-binding suggestions or recommendations of candidate topics or questions that can be asked of the user. Non-binding suggestions are sent from the tax logic agent to a user interface controller. The suggestions are non-binding in that the user interface controller decides whether and when to process them based on, for example, other actions that are in the process of being performed by the user interface controller, the status of other tax topics, or a configuration file. The user interface controller selects at least one non-binding suggestion, and executes a pagination engine that receives prioritization data and generates an output based at least in part upon the prioritization data. According to embodiment, the output identifies a sequence, order or priority of questions or topics, or a sequence, order or priority together with a pagination structure. The user interface controller generates a paginated interview screen that is presented to the user through a display of the computing device that includes questions or tax topics based at least in part upon the pagination engine output.

Further embodiments involve computerized systems of tax return preparation applications that are executable by a computing device to prepare an electronic tax return. One embodiment of a system comprises a user interface controller that includes a pagination engine, a tax logic agent that is communication with the user interface controller, and a data store shared by the user interface controller and the tax logic agent. The user interface controller can write data to the data store, and the tax logic agent can read data from the shared data store. The tax logic agent and the user interface controller are decoupled or separated from each other such that tax logic is not integrated within interview screens and instead is independent of the interview screens. The tax logic agent is configured or programmed to read runtime data of the electronic tax return from the shared data store, select candidate topics or questions based at least in part upon the runtime data, and generate a plurality of non-binding suggestions of candidate topics or questions to be presented to the user. The user interface controller is configured or programmed to receive the plurality of non-binding suggestions generated by the tax logic agent, select at least one non-binding suggestion, and execute a pagination engine. The pagination engine is configured or programmed to receive prioritization data and generate an output based at least in part upon the prioritization data. The user interface controller is configured or programmed to generate an interview screen comprising a paginated screen including topics or questions of the at least one selected non-binding suggestion and structured based at least in part upon the pagination engine output, and present the generated interview screen to the user through a display of the computing device.

Another embodiment involves ranking questions presented to a user of a tax return preparation application during preparation of an electronic tax return. Ranking results may be presented as part of a paginated structure or other structure that distinguishes questions categorized as "required" to be answered versus other "non-required" questions including questions that are identified based on inferences or assumptions made about the user based on the tax logic that indicates what is required in view of a ranking data, which may be statistics or a result generated by execution of a predictive model. In one embodiment, a tax logic agent reads first runtime data of a shared data store, accesses a decision table that includes rules, and identifies unanswered questions for active rules of the decision table, or rules that are active in that they still require answers before all of the rule conditions are satisfied to make a conclusion. The decision table does not include a question ranking and instead identifies questions pertinent to decision table rules. The tax logic agent determines a ranking of questions required to be answered based at least in part upon first ranking data from a first data source. Ranking data indicates which required questions are more likely to apply to the user than other required questions. The tax logic agent generates a first non-binding suggestion identifying ranked questions required to be answered, and transmits the first non-binding suggestion to the user interface controller. The user interface controller generates an interview screen incorporating ranked questions required to be answered of the first non-binding suggestion. The ranked required questions are distinguished from other questions in the interview screen.

For example, in certain embodiments, the interview screen may include a paginated structure in the form of a sorted list in which ranked required questions are first or at the top of the list compared to other questions. In other embodiments, an interview screen includes a frame structure in which a first frame or segment may be for ranked required questions, and other frames or segments can be for other respective types or categories of questions.

A further embodiment is directed to computer-implemented method for ranking questions for presentation to a user of a tax return preparation application during preparation of an electronic tax return and comprises a tax logic agent reading first runtime data of the shared data store, accessing a decision table comprising a plurality of rules, identifying unanswered questions for active rules of the decision table that must be answered based on the first runtime data, wherein the decision table does not include a question ranking. The method further comprises the tax logic agent receiving first ranking data from a first data source or other questions that may be required to be answered and generating a first non-binding suggestion. The first non-binding suggestion comprises the unranked required questions and ranked questions that may be required to be answered based at least in part upon the first runtime data and the first ranking data. The method further comprises the tax logic agent transmitting the first non-binding suggestion to the user interface controller. The user controller generates an interview screen that is presented to the user, the interview screen comprising unranked required questions and questions that may be required to be answered of the first non-binding suggestion. Unranked required questions are prioritized over the ranked questions that may be required in the generated interview screen.

Yet another embodiment is directed to a computerized system of a tax return preparation application executable by a computing device. On embodiment of a system comprises a user interface controller, a tax logic agent and a shared data store. The tax logic agent in communication with the user interface controller, the user interface controller can write data to the shared data store, and the tax logic agent can read data from the shared data store. The tax logic agent is configured or programmed to read runtime data of the electronic tax return from the shared data store, access a decision table comprising a plurality of rules, identify unanswered questions for active rules of the decision table that must be answered based on the runtime data. The decision table does not include a question ranking. The tax logic agent, by a ranking module, is configured or programmed to determine questions required to be answered based at least in part upon first ranking data from a first data source. The first ranking data indicates which required questions are more likely to apply to the user than other required questions. The tax logic agent is further configured to generate a first non-binding suggestion identifying ranked questions required to be answered, and transmit the first non-binding suggestion to the user interface controller, which is configured or programmed to generate an interview screen incorporating ranked questions required to be answered of the first non-binding suggestion, ranked required questions being distinguished from other questions in the interview screen.

Yet other embodiments involve non-transitory computer-readable medium comprising instructions, which when executed by a processor of a computing device, causes the computing device to execute processes for paginating questions presented to a user of a tax return preparation application during preparation of an electronic tax return and/or ranking questions presented to a user of a tax return preparation application during preparation of an electronic tax return, which may be presented in a pagination structure generated according to embodiments.

In a single or multiple embodiments, prioritization data is iteratively updated and non-binding suggestions are iteratively updated as runtime data is updated or new runtime data is entered or imported and stored. This results in the content of a paginated screen being iteratively updated with new questions or topics or different categorizations or sequences of same. For example, a question that was initially identified as a "maybe" question or question that may be pertinent or necessary given certain runtime data, may be converted into a "required" question or topic that must be answered or addressed.

In a single or multiple embodiments, the user interface controller utilizes the same pagination structure and updates the content thereof, i.e., updates the pagination structure with different or other categories or sequences of questions or topics. The pagination structure may be in the form of a sorted list or include a plurality of frames for respective categories of questions or topics. The user can select which pagination structure should be utilized and may toggle between different views or pagination structures with a designated input such as a hot key. Thus, in one embodiment, a first set of questions or topics that are the subject of one or more non-binding suggestions may be integrated into a sorted list, whereas a subsequent, second set of questions or topics that are the subject of one or more subsequently generated non-binding suggestions may be integrated into a framed view.

In a single or multiple embodiments, prioritization data utilized by the pagination engine is data of ranking non-binding suggestions generated by the tax logic agent. Suggestion ranking may involve or be based at least in part upon a category of a candidate question that is included within or that is the basis for generating a non-binding suggestion. Suggestion ranking may also involve or be based at least in part upon whether a non-binding suggestion involves questions or topics that must be answered, e.g., to satisfy a tax authority requirement, versus those that may be required and/or a number of questions or topics for a given category given current runtime data, or an inference or assumption about the user and the degree or number of inferences or assumptions that were performed in order to identify a candidate question. Suggestion ranking may also be based on a number of rules of a decision table that remain active when candidate questions involving that decision table are answered or a number of questions of a rule of a decision table utilized by the tax logic agent would remain unanswered when candidate questions involving the rule are answered.

In a single or multiple embodiments, prioritization data utilized by the pagination engine is data of ranking individual candidate questions. Candidate question may involve or be based at least in part upon an estimated probability of how a question will be answered or how a possible answer to the individual candidate question would eliminate other questions of a decision table utilized by the tax logic agent from consideration.

In a single or multiple embodiments, prioritization data may include or be based at least in part upon a category of a candidate question of a non-binding suggestion. Categories of questions or topics which, in one embodiment, are determined by the tax logic agent, may include a question or topic is required to be answered or addressed in order for the electronic tax return to be completed or to satisfy a tax authority requirement, a question or topic is inferred to be required to be answered or addressed based at least in part upon current runtime data and statistical data and/or based on a result of execution of a predictive model.

In a single or multiple embodiments, prioritization data includes both ranking data (suggestion and/or question ranking) and categorization data. The manner in which a particular question or topic is integrated into the paginated structure may be based at least in part upon a weighting function, ranking data taking priority over categorization data or categorization data taking priority over ranking data. Prioritization data may also be aggregated from multiple suggestions and compiled for selection and integration into a pagination structure. For example, multiple non-binding suggestions may include a rank or score for candidate questions. These ranked or scored questions are aggregated into a single data structure such that the rankings or scores of each question relative to each other question can be determined, and then the questions or topics are selected for integration into the pagination structure such as a sorted list or framed view. When a sorted list is used, the questions or topic positions in the sorted list can be based on the rankings or scores of the aggregated data structure. When a framed view is used, the top ranked or scored questions can be integrated into a first frame, the next highest group of questions or topics into a second frame, and so on. Frames can also be designated for particular categories, such as questions or topics that are "required" to be answered, "maybe" questions or questions that may be required based on some inference, e.g., based on statistical data and current runtime data, or assumption or default data.

In a single or multiple embodiments, while categorization and/or ranking prioritization data are utilized to construct an interview screen having a paginated structure, according to one embodiment, the user of the tax return preparation application is not aware of how or why the questions or topics are arranged. In other words, with a sorted list, for example, the user may view the questions, but is not aware that a certain question is categorized as "required" whereas a subsequent question is categorized as a "maybe" question, or that a certain question was scored or ranked higher than another question. As another example, while questions or topics may be divided among multiple frames, the user may not be aware of why a certain question was allocated to one frame versus another. In other embodiments, the user may be presented with data that is indicative of the relevance of a question or topics, e.g., in a framed view, and can select tabs that allow the user to select or focus on questions of a particular category corresponding to the tab, e.g., the user selects a "required" tab and is presented only with questions that are currently categorized as "required" based on the current runtime data.

In embodiments involving a sorted list, questions or topics of the sorted list may be sorted based on category. For example, questions categorized as "required" may be presented first or earlier in the list compared to other questions or topics that are not so categorized.

In a single or multiple embodiments, a user can select a question or topic of a paginated interview screen to answer or address independently of a presented sequence of questions or topics of the paginated screen. Thus, if a sorted list presents questions 1-20, the user may select and answer question 15 rather than begin with question 1. Then, after question 15 is answered, and the runtime data in the shared data store has been updated, the tax logic agent reads the updated runtime data and executes additional iterations of generating non-binding suggestions, which are then provided to the user interface controller. Thus, by selecting question 15, the initial list of 20 questions may be dynamically updated to include only 10 questions as a result of the updated runtime data. In the event that a list, whether a sorted list or a list of questions in a frame, includes more questions than can be displayed, the user can scroll through list or frame to view other questions.

In a single or multiple embodiments, a paginated screen may include a search capability. In one embodiment, the user can submit a search request, e.g., based on a certain category by entering "required" into a search field. The pagination engine identifies questions or topics of non-binding suggestions that are categorized as "required" and modifies or updates the currently displayed paginated screen to generate a second paginated screen comprising the identified questions or topics categorized as "required" per the user's search request. A search request may also be submitted by the user selecting a pre-defined tab of an interview screen. For example, certain tabs may be designated for "required" questions or topics or other "maybe" questions or topics. Selecting a tab results in the pagination engine updating the current view to reflect the user's request, e.g., by including only those questions categorized as "required" and omitting questions that are not so categorized.

In a single or multiple embodiments, the tax logic agent ranks questions of a decision table accessed by the tax logic agent that are categorized as "required" such as those questions that must be answered in order to satisfy minimum fileability or other requirements of a tax authority or to complete a particular topic or the electronic tax return.

In a single or multiple embodiments, question ranking can be performed using statistical data, e.g., statistical data of other users of the tax return preparation application for the current tax year or prior tax year(s). Instead of, or in addition to utilizing statistical data, other embodiments involve the tax logic agent executing one or more predictive models. When questions are ranked, ranking may involve some or all of the questions being ranked. When required questions are ranked, required questions that are ranked may be presented before or presented in a prioritized manner compared to unranked questions of the same type or category. Thus, in a paginated structure ranked required questions can be listed first or emphasized or prioritized, whereas other required questions can be incorporated into the paginated structure in a unranked order, e.g., based on random selection.

In a single or multiple embodiments, the number of questions can be analyzed and adjusted for presentation to the user through an interview screen. For example, the UI controller can determine a total number questions comprising a sum of: ranked and required questions, unranked and required questions, and question that may be required. If the total number exceeds a pre-determined maximum number, the "maybe" or "possible" questions can be eliminated from the interview screen, at least for a current iteration of analysis of the runtime data, but may be presented at a later time in a subsequently generated interview screen. This may be used to, for example, adapt to different form factors of computing devices having displays that can accommodate different numbers of interview questions.

In a single or multiple embodiments, question categorizations are modified or changed, e.g., a previously identified "maybe" question may now be "required" given changes in the runtime or instance data, and question rankings may also be modified or updated accordingly. Thus, question categorizations and rankings can change dynamically as runtime data is changed or modified, e.g., as users respond to questions or import data from electronic files.

BRIEF DESCRIPTION OF THE DRAWINGS

FIGS. 2A-B are system flow diagrams illustrating how paginated interview screens can be generated based at least in part upon prioritization data of non-binding suggestions of questions or tax topics selected for presentation to a user of a tax return preparation application;

FIG. 9B illustrates another embodiment of a decision table that incorporates statistical data that may be used for determining a likelihood or probability of an answer to a question of the decision table according to embodiments;

FIG. 10 illustrates an example of how a rule engine may process a decision table when determining which question to select;

FIG. 14A illustrates one example of how prioritization data in the form of rankings of questions of non-binding suggestions is utilized to generate a pagination structure in the form of a sorted list and how ranked questions or tax topics of non-binding suggestions can be integrated within the sorted list.

DETAILED DESCRIPTION OF ILLUSTRATED EMBODIMENTS

Embodiments involve computer-implemented methods, computerized systems and articles of manufacture or computer program products for dynamically ranking questions for presentation to a user of a tax return preparation application and/or generating a paginated structure for questions or topics to be presented to a user of a tax return preparation application.

Question ranking can be based on a combination of current runtime data relative to tax logic defining required questions and ranking data from another source. Ranking data may be in the form of statistical data and/or results generated by execution of one or more predictive models. Question ranking is reflected in an interview screen that is generated and presented to the user. For example, a paginated interview screen provides a visual indication or rendering of question or topic relevancy, which may be based on score, rank and/or category data. Search or filter capabilities are also provided to focus or narrow the types or numbers of questions or topics presented in the generated structure. As additional runtime data is received, or data is changed or updated which, in turn, results in changes to question scores, rankings and/or categorizations, and corresponding changes to how questions are presented within updated interview screens. These capabilities are implemented in a tax return preparation system in which tax logic is separated from interview screens and the questions or topics selected, and their visual presentation within a pagination structure to convey relevancy thereof, are dynamically modified as electronic tax return data is updated, entered or imported. For example, while embodiments may be used to select certain questions or topics as priorities, these same questions or topics may be assigned a lower priority or ranking, or eliminated, in view of new or updated electronic tax return data. These changes are visually conveyed to the user such that the user knows, based on the current electronic tax return data, which questions or topics are considered to be more relevant than others, so that the user can focus on those more relevant questions or topics, while also having the flexibility of selecting and answering or addressing other questions or topics.

Figure 1:
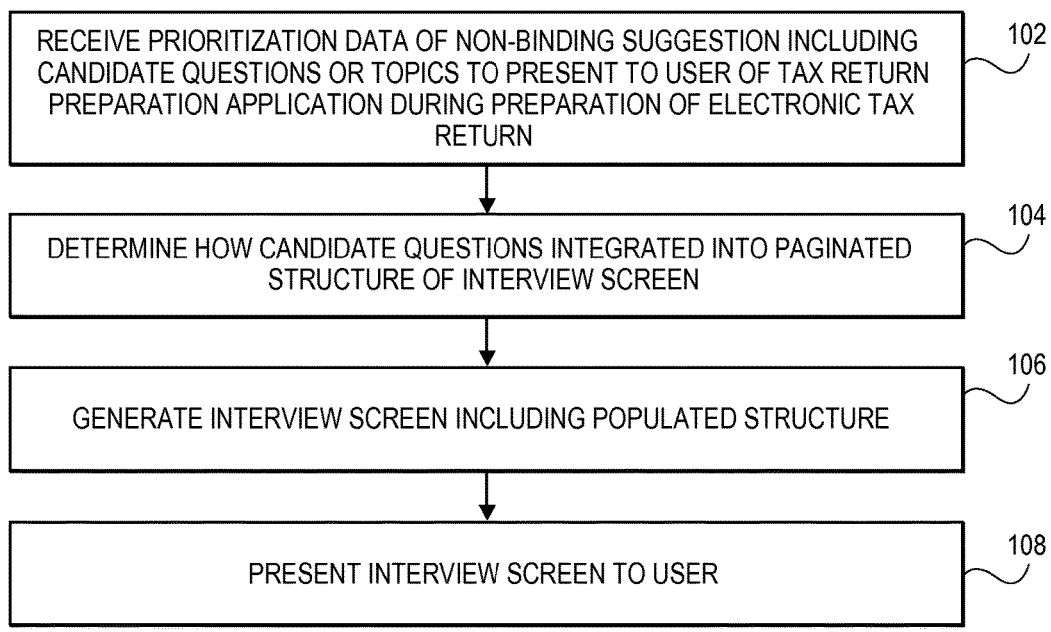
FIG. 1 is a flow diagram of one embodiment of a computer-implemented method for generating paginated interview screens during preparation of an electronic tax return.

Referring to FIG. 1, a computer-implemented method performed according to one embodiment and executed by a user interface controller that includes a special purpose pagination engine comprises, at 102, the user interface controller, by the pagination engine, receiving prioritization data of non-binding suggestion including candidate questions or topics to present to user of tax return preparation application during preparation of electronic tax return. At 104, the user interface controller, by the pagination engine, determines how candidate questions are, or can be, integrated into a paginated structure of an interview screen. At 106, the user interface controller, based at least in part upon an output generated by the pagination engine, generates an interview screen that includes a paginated structure that is populated with questions or topics of non-binding suggestions that are selected by the user interface controller for processing.

Referring to FIGS. 2A-B, a computerized system 200 of a tax return preparation application that is constructed according to one embodiment includes a tax logic agent 210, a pagination engine 220, a UI controller 230 and a data store 240 that includes runtime or instance data 242. Data store 240 is shared by tax logic agent 210 and UI controller 230 such that tax logic agent 210 can read runtime data 242 from shared data store 240, and UI controller 230 can write data to shared data store 240. The system comprises or involves tax logic agent 210 comprising or executing a rule engine or processor that receives various types of data about candidate questions such as scores or rankings of candidate questions, candidate question categories. Tax logic agent 210 generates non-binding suggestions 211 for UI controller 230, and tax logic agent 210 may also rank non-binding suggestions 211. UI controller 230 receives one or more non-binding suggestions 211, which includes prioritization data 214 including one or more or all of candidate question scores or rankings, candidate question categories, and non-binding suggestion 211 scores or rankings. Prioritization data 214 is utilized by UI controller 230 to generate an interview screen 232 including a paginated structure 234 that includes or is populated with candidate questions or topics 262.

Figure 3:
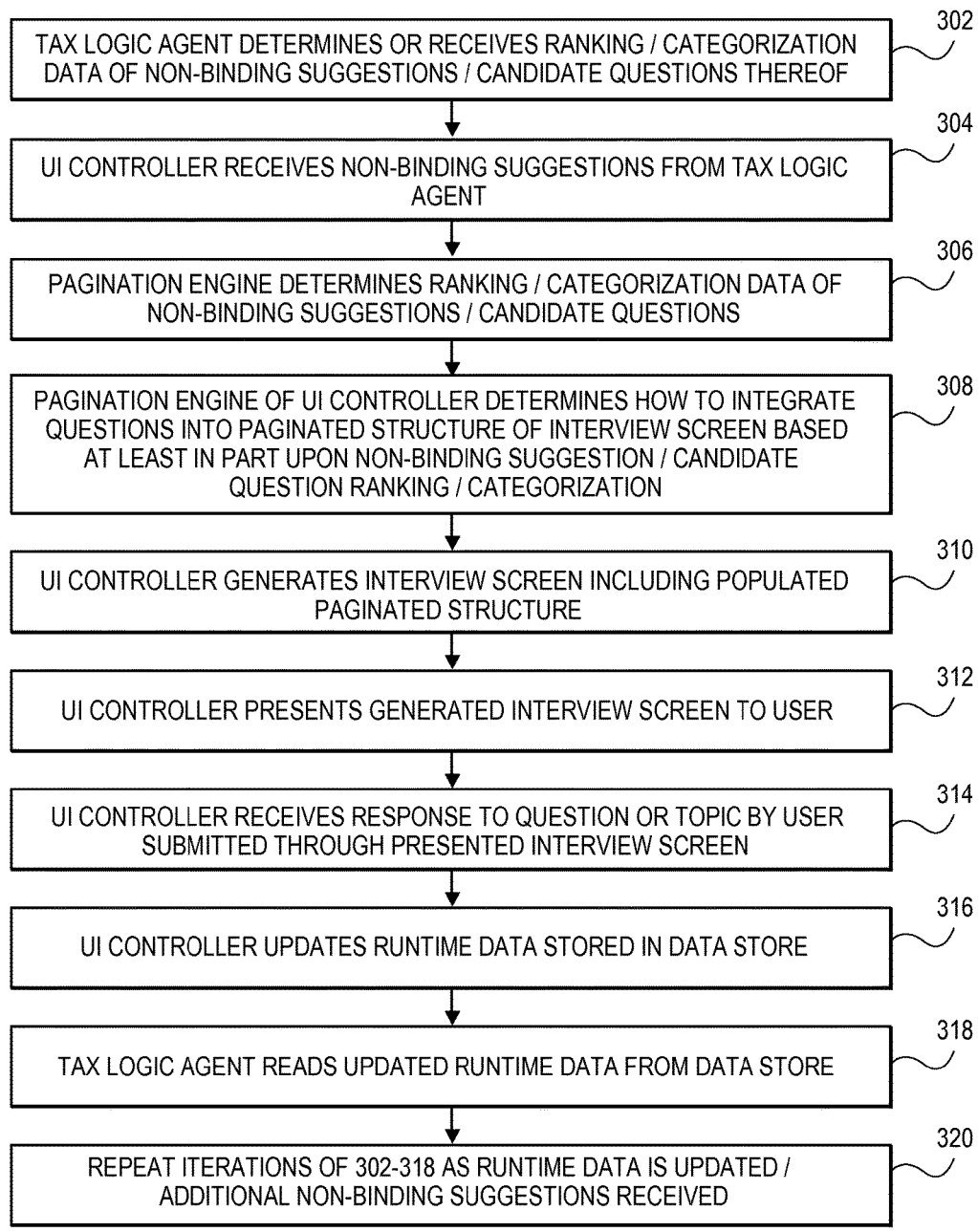
FIG. 3 is a flow diagram illustrating how paginated interview screens can be iteratively determined and generated by pagination engine of a user interface controller according to one embodiment and involving a non-binding suggestion including prioritization data from a tax logic agent and a data store shared by the user interface controller and tax logic agent.

Referring to FIG. 3, in a computer-implemented method 300 according to one embodiment utilizing system 200 components shown in FIG. 2, at 302, tax logic agent 210 reads runtime data 242 from shared data store 240 and generates non-binding suggestions 211 including or identifying candidate questions or topics 262 to present to user of the tax return preparation application. At 304, UI controller 230 receives non-binding suggestions 211, and at 306, pagination engine 220 which, in the illustrated embodiment, is a module or component of UI controller 230, determines prioritization data 214 of non-binding suggestions 211. Prioritization data 214 may be, for example, one or more or all of category, score and ranking determinations made by tax logic agent 210, such as rankings of non-binding suggestions 211, ranking of candidate questions or topics 262 of non-binding suggestions 211, or categories of questions or topics 262. At 308, in the illustrated embodiment, pagination engine 220 also receives as an input possible pagination structures 222 that can be utilized, and determines how candidate questions 262 can be integrated into one or more available paginated structures 222 for an interview screen 234, or how a paginated structure 222 can be populated to include questions or topics 262. At 210, output 223 generated by pagination engine 220 is utilized by UI controller 230, to generate interview screen 234 that is configured according to or embodies one or more pagination structures 222. Interview screen 234 incorporates questions or topics 262 of non-binding suggestions 211 selected by UI controller 230 for processing and using pagination engine output 223 that is based at least in part upon prioritization data 214. According to one embodiment, as illustrated in FIG. 2A, pagination engine 220 receives possible pagination structures 222 that could be utilized and can select a pagination structure 222. In other embodiments, output 223 generated by pagination engine 220 is used by UI controller 230 that selects pagination structure 222. At 212, interview screen 234 is presented to user, which provides data in response and that is received by UI controller 230 at 214. At 216, UI controller 230 writes to share data store 240 to update runtime data 242, and at 218, tax logic agent 210 reads updated runtime data 242 from shred data store 240. At 220, 202-218 can be repeated as runtime data 242 is updated and additional non-binding suggestions 211 are received until a pre-determined status or conclusion such as completion or "done status" of a tax topic or preparation of a completed or fileable electronic tax return. Further details regarding embodiments and aspects of embodiments are described with reference to FIGS. 4A-25.

Figure 4A:
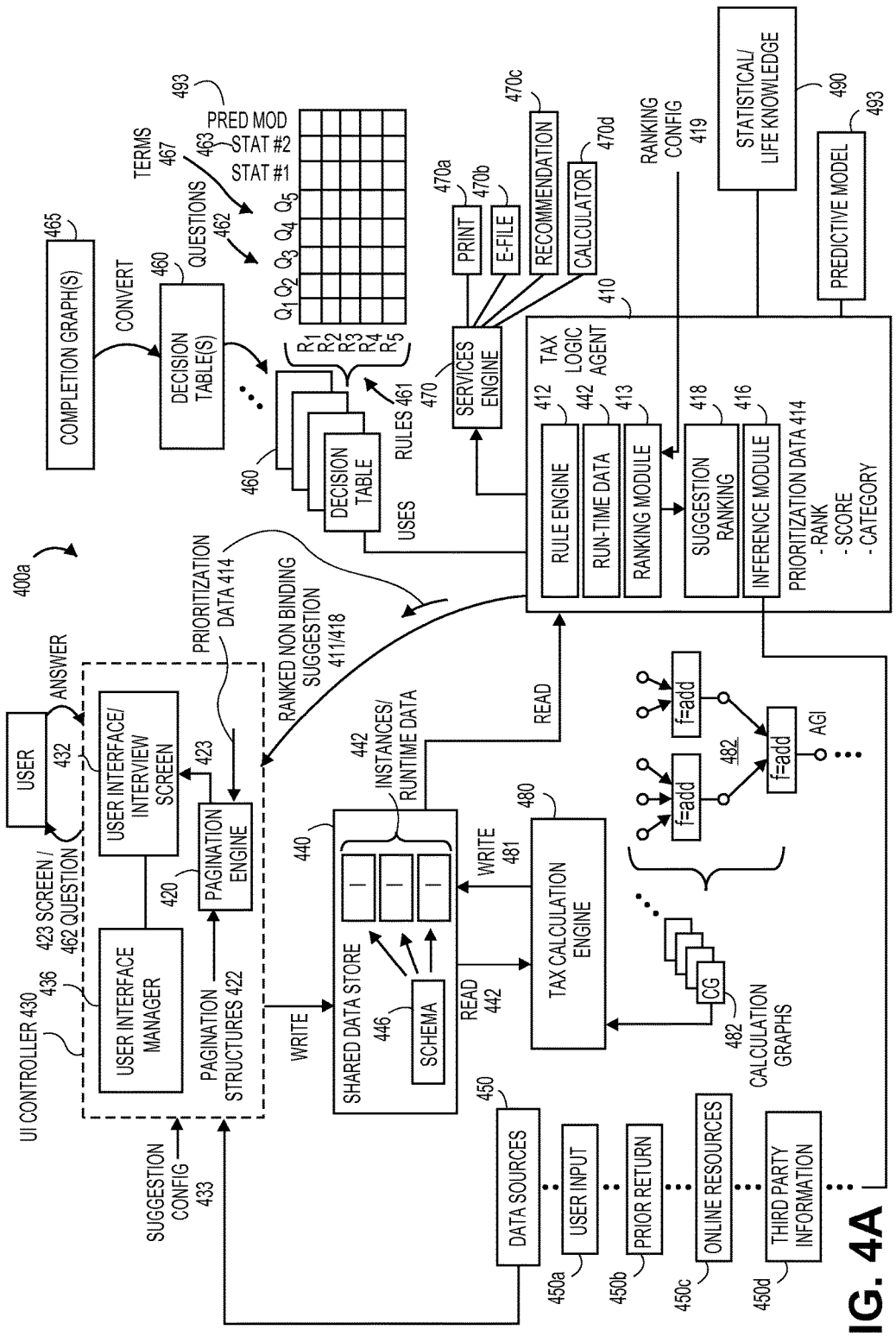
FIG. 4A illustrates a block diagram of a computerized system constructed according embodiments for generating paginated interview screens for presenting questions or tax topics determined utilizing prioritization data including ranking of non-binding suggestions during preparation of an electronic tax return.
Figure 4B:
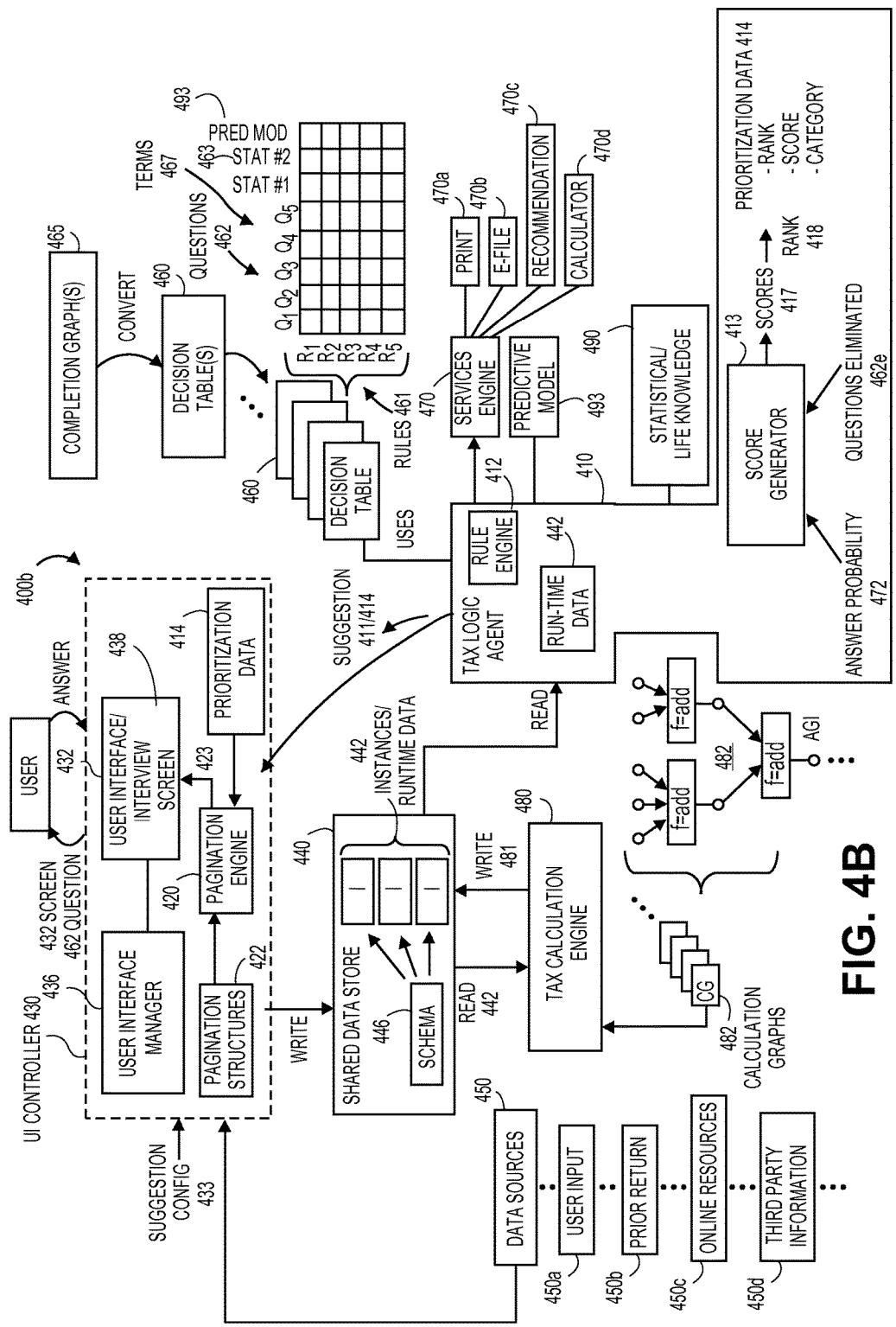
FIG. 4B illustrates a block diagram of a computerized system constructed according embodiments for generating paginated interview screens for presenting questions or tax topics determined utilizing prioritization data including ranking and/or categorization of questions or tax topics of non-binding suggestions during preparation of an electronic tax return.

FIGS. 4A-B are more detailed illustrations of systems 400a-b constructed according to embodiments that are operable or configured to generate prioritization data utilized for interview screen pagination and integration of questions or topics into a pagination structure of the interview screen. FIGS. 4A-B illustrate components or aspects of multiple embodiments, but it will be understood that embodiments may involve various components and combinations thereof.

FIG. 4A illustrates one embodiment of a system in which non-binding suggestions 411 that include candidate questions 462 are ranked and the ranked non-binding suggestions 411 are provided to UI controller 430, e.g., as described in U.S. application Ser. No. 14/462,058, filed Aug. 18, 2014, entitled "COMPUTER IMPLEMENTED METHODS SYSTEMS AND COMPUTER PROGRAM PRODUCTS FOR RANKING NON-BINDING SUGGESTIONS DURING PREPARATION OF ELECTRONIC TAX RETURN, the contents of which were previously incorporated by reference herein.

FIG. 4B illustrates an embodiment in which candidate questions 462 are scored and ranked based at least in part criteria including combination of tax logic or decision table determinations performed by tax logic agent 410 and a type of probability, estimate, assumption or inference determination, which may involve statistical analysis or execution of a predictive model using electronic tax return data as inputs, e.g., as described in U.S. U.S. application Ser. No. 14/461, 982, filed Aug. 18, 2014, entitled COMPUTER IMPLEMENTED METHODS SYSTEMS AND COMPUTER PROGRAM PRODUCTS FOR CANDIDATE QUESTION SCORING AND RANKING DURING PREPARATION OF ELECTRONIC TAX RETURN, the contents of all of which are incorporated herein by reference as though set forth herein in full.

Referring to FIG. 4A, in a system constructed according to on embodiment that is configured or operable to generate an interview screen including a paginated structure based on prioritization data in the form of ranking of non-binding suggestions, which may also involve aspects of candidate questions such as categories thereof. In the illustrated embodiment, the system includes tax logic agent 410 comprising or executing rule engine or processor 412 that is used to scan or analyze decision tables 460 using runtime or instance data 442. Rule engine 412 may utilize a fact cache to generate either non-binding suggestions 411 for additional question(s) 462 to present to a user or "Done" instructions which indicate that completeness has occurred and additional input is not needed. Rule engine 412 may, for example, operate in the form a Drools expert engine. Other declarative rules engines 412 may be utilized and a Drools expert rule engine is provided as one example of how embodiments may be implemented. Tax logic agent 410 may be implemented as a dedicated module or engine that is executed by or as part of the tax return preparation application and may be embodied as a programmed subroutine that is executed by a processor or controller as described herein.

In certain embodiments, and as illustrated in FIG. 4A, tax logic agent 410 includes or utilizes suggestion scoring or ranking module 413. While rule engine 412 and suggestion ranking module 413 are shown as separate components of tax logic agent 410, it will be understood that they may both be included within tax logic agent 410 or tax logic agent 410 may utilize suggestion ranking module 413. For ease of explanation, reference is made generally to tax logic agent 410 executing certain steps, or more specifically to suggestion ranking module 413.

Tax logic agent 410 reads runtime 442 from shared data store 440. UI controller 430 and tax calculation engine 480 are also in communication with shared data store 440. Tax logic agent 410 can read runtime data 442 from shared data store 440, UI controller 430 can write data to shared data store, and calculation engine 480 can read data from shared data store, perform a calculation using a calculation graph 482, and write a calculation or result to shared data store 440.

Tax logic agent 410 is operable to receive runtime or instance data 442 (generally, runtime data 442) based on a "dictionary" of terms of data model or schema 446 (generally, schema 446). Schema 446 specifies, defines or lists tax-related concepts or terms, e.g., by names, type or category and hierarchy such as "name," "social security number," "citizenship," "address," "employer," "interest," "dividends," "mortgage," "deduction," "tax credit," "capital gain," etc. An instance 442 is instantiated or created for the collection of data received and for each term or topic of schema 446. Schema 446 may also specify data constraints such as a certain format of questions and answers (e.g., answer is binary (Y/N) or a number/value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of a schema 446 that can be utilized in embodiments.

With continuing reference to FIG. 4A, runtime data 442 stored in shared data store 440 is used to populate corresponding fields of an electronic tax return or electronic tax forms or documents used to prepare electronic tax return and may be received from or based on data from various data sources 450a-d (generally, data source 450). Examples of data sources 450 include user input or manual entry of data into an interview screen generated by UI controller 430, data imported from a prior year electronic tax return, data from online resources (such as online social networks or other online resources) and third parties databases or resources (such as government databases or documents, such as property tax records, Department of Motor Vehicle (DMV) records, etc. Tax logic agent 410 reads runtime data 442 from shared data store 440 and utilizes or executes rules 461 expressed in data structure such as a decision table 460 to determine, based on currently available runtime data 442, what other data or answers are still needed or, in other words, what conditions of a rule 461 still need to be satisfied in order to reach a conclusion or completeness status for subject matter of decision table 460, and which questions or topics 462 of decision table 460 or other data structure should be presented to user in order to obtain that other needed data to reach a conclusion. For example, a rule 461 specified by decision table 462 may be based on a tax authority requirement or law, and may generally specify that If X, and Y, and Z, then Conclusion.

Rules may involve various topics. "Tax" rules 461 that are utilized by rule engine 412 may specify types of data or tax documents that are required, or which fields or forms of the electronic tax return should be completed. One simplified example is if a taxpayer is married, then the electronic tax return is required to include information about a spouse. Tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of the data model or schema 446.

Rules 461 are utilized or scanned by tax logic agent 410 to identify or narrow which questions 462, as provided in decision table 460, are identified as potential or candidate questions 462 to be presented to the user. This may involve utilizing rules 461 based on one or more associated data structures such as decision table 460, which is based on a completion graph 465. Completion graph 465 recites, for example, requirements of tax authority or tax authority rules or laws. Decision table 460 may be used for invalidation of potential questions 462 or topics and input or runtime data 442 requirements.

For example, referring to FIGS. 5-9B, completeness or directed graph 465 reflects a flow of questions and answers of requirements, rules or laws 500 a tax authority or tax collecting entity, and completeness or directed graph 465 is converted into decision table 460. Aspects of directed graphs and decision tables 460 are described in further detail in U.S. application Ser. No. 14/097,057, filed Dec. 4, 2013, entitled Methods Systems and Computer Program Products for Applying Generated Rules for Personalized Interview Experience," U.S. application Ser. No. 14/206,834, filed Mar. 12, 2014, entitled "Computer Implemented Methods Systems and Articles of Manufacture for Suggestion-Based Interview Engine for Tax Return Preparation Application, and U.S. application Ser. No. 14/448,678, filed Jul. 31, 2014, and entitled "Computer Implemented Methods Systems and Articles of Manufacture for Preparing Electronic Tax Return With Assumption Data," and U.S. application Ser. No. 14/448,886, entitled "System and Method Representing Tax Rules and Calculations Thereof Using Declarative Data Structures, filed Jul. 31, 2014, the contents of all which are expressly incorporated herein by reference as though set forth herein in full.

FIGS. 5-8 illustrate graphically how tax legislation/tax rules 500 are broken down into completeness graph 465 and tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5:
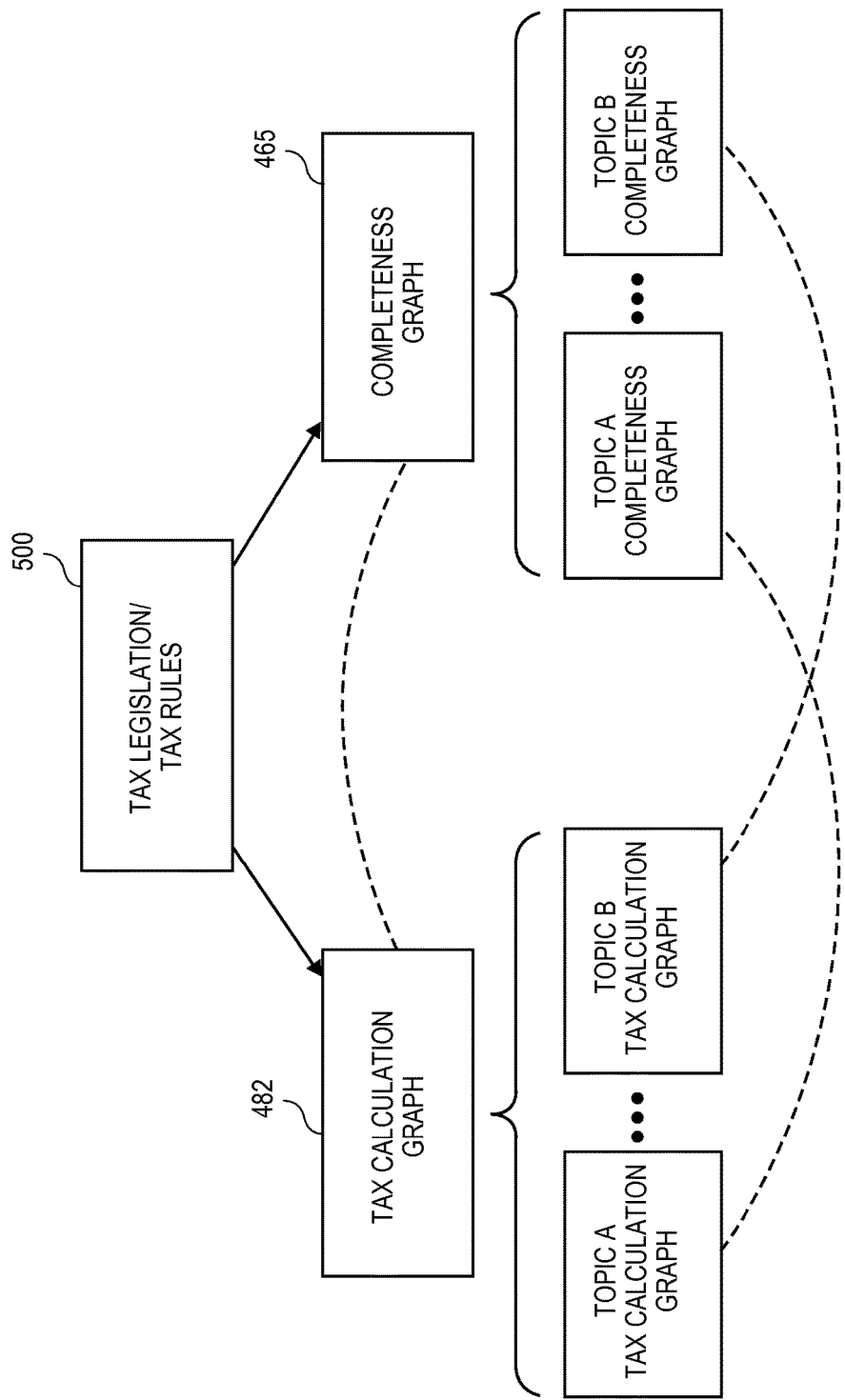
FIG. 5 schematically illustrates how tax legislation or tax rules are parsed and represented by a completeness graph and a tax calculation graph according to embodiments.
Figure 6:
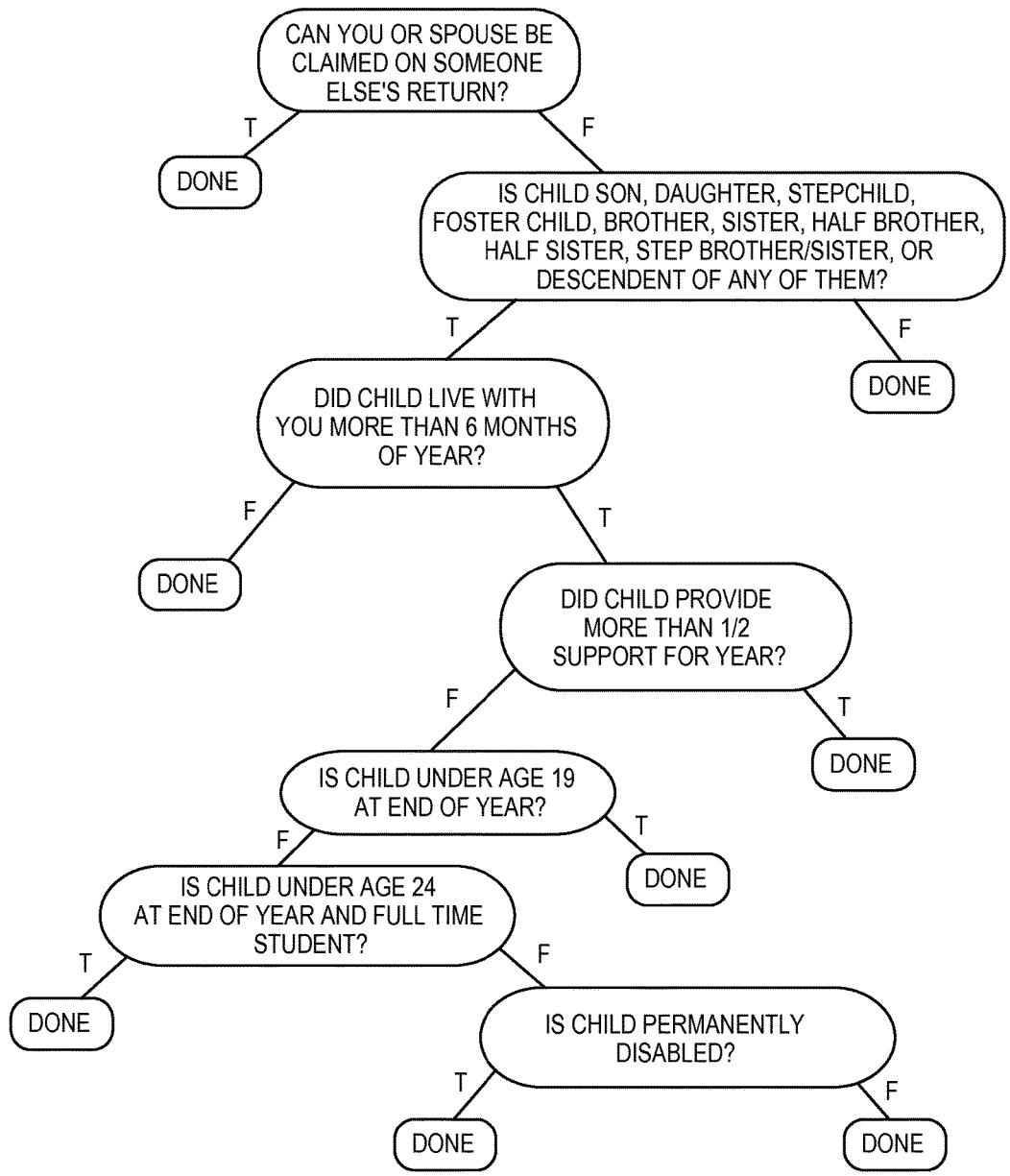
FIG. 6 illustrates an example of a simplified version of a completeness graph related to a qualifying child for purposes of determining deductions for federal income tax purposes.

As shown in FIG. 5, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, completion graph 465 may reference or be associated with a particular schema 446 element and associated instance data 442 in shared data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed to prepare and ultimately file a tax return, and the tax return can be prepared and filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 7:
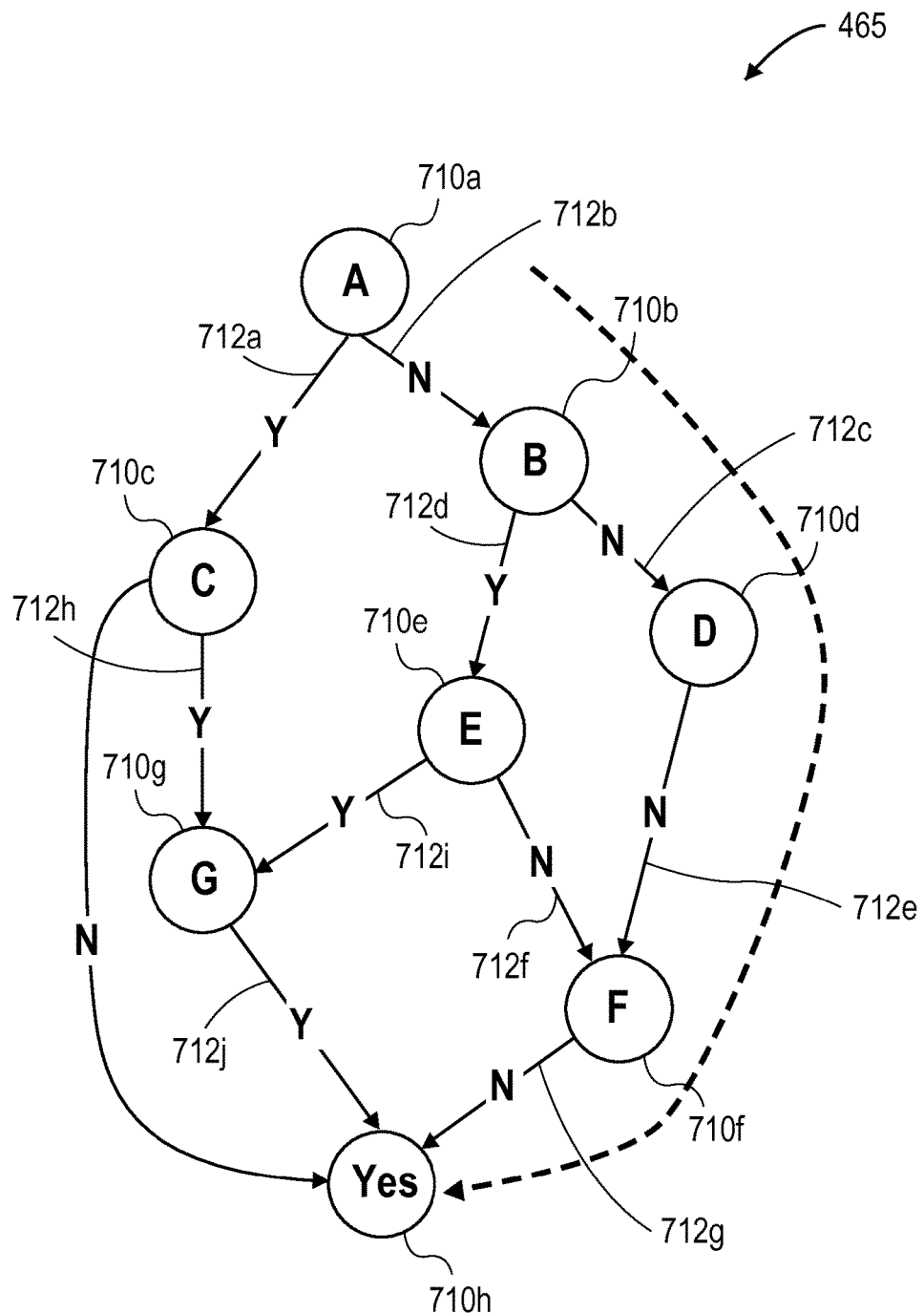
FIG. 7 generally illustrates an example of a completeness or directed graph that may be utilized in embodiments.

Completeness graph 465 and tax calculation graph 482 represent data structures that can be constructed in the form of tree. FIG. 7 generally illustrates completeness graph 465 in the form of a tree structure including nodes 710*a-h*, in which node 710*a* is a beginning or start node, a "Yes" or termination node 710 indicating completion, and arcs 712 *a-j* representing different possible answers and the relationship between different nodes 710 or questions depend on a basic or general version of a completeness graph 465 for the particular topic, such as determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 710 contains a condition that in this example is expressed as a Boolean expression that, in the illustrated embodiment, can be answered in the affirmative or negative. Arcs 712 that connect each node 710 illustrate the answers and dependencies between nodes 710, and the combination of arcs 712 in completeness graph 465 illustrates the various pathways to completion. A single arc 712 or combination of arcs 712 that result in a determination of "Done" represent a pathway to completion. As generally shown in FIG. 7, there are several pathways to completion.

More specifically, FIG. 7 generally illustrates completeness graph 465 that includes beginning node (Node A) 710a, intermediate nodes (Nodes B-G) 710b-g and a termination node (Node "Yes" or "Done") 710h. Each of the beginning node 710a, and intermediate nodes 710b-g represents a question. Inter-node connections or arcs 712 represent response options. In the illustrated embodiment, each inter-node connection 712 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 6, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 710 with a large number of pathways to completion. However, by many branches or lines within the completeness graph 465 can be ignored, for example, when certain questions internal to the completeness graph 465 are answered that eliminate other pathways, or other nodes 710 and arcs 712, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Figure 8:
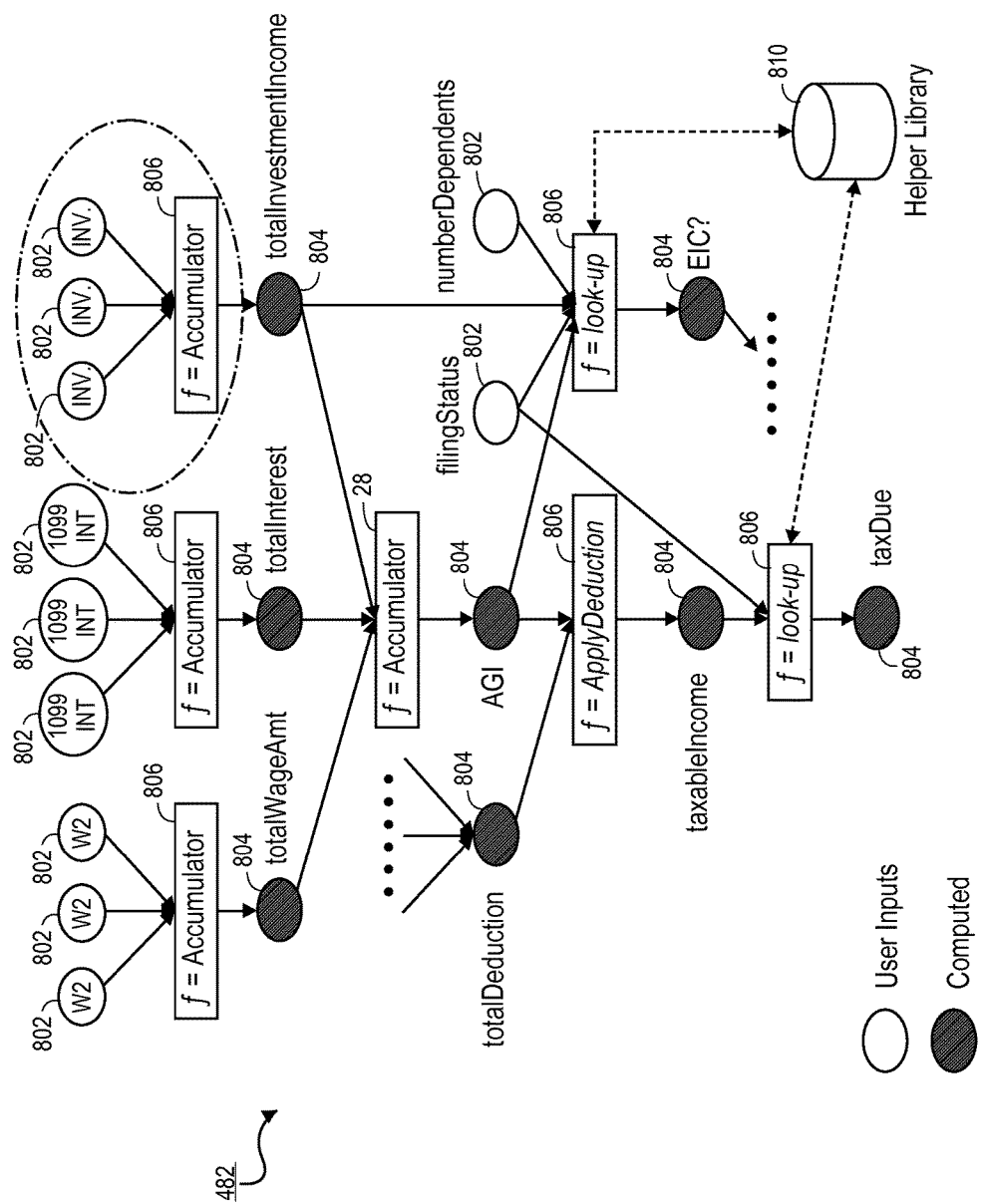
FIG. 8 illustrates an example of a calculation graph that may be utilized in embodiments.

FIG. 8 illustrates one example of a tax calculation graph 482. The tax calculation graph 482 semantically describes data dependent tax operations that used perform a tax calculation in accordance with the tax code or tax rules. Tax calculation graph 482 in FIG. 8 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 8, various nodes 802 are leaf or input nodes. Examples of leaf nodes 802 in this particular example include data obtained from W-2 forms, data obtained from 1099-INT forms, data obtained from other investment income (INV), filing status, and number of dependents. Typically, though not exclusively, leaf nodes 802 are populated with user inputs. That is to say the user taxpayer will enter this information from a user interface as described herein. In other embodiments, however, the leaf nodes 802 may be populated with information that is automatically obtained by the tax preparation software. For example, in some embodiments, tax documents may be imaged or scanned with relevant data being automatically extracted using Object Character Recognition (OCR) techniques. In other embodiments, prior tax returns may be used by the tax preparation software to extract information (e.g., name, potential dependents, address, and social security number) which can then be used to populate the leaf nodes 802. Online resources such as financial services websites or other user-specific websites can be crawled and scanned to scrape or otherwise download tax related information that can be automatically populated into leaf nodes 802. Additional third party information sources such as credit bureaus, government databases, and the like can also be used by the tax preparation software to obtain information that can then be populated in to respective leaf nodes 802.

In still other embodiments, values for leaf nodes 802 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for leaf nodes 802 may be estimated.

Still other internal nodes referred to as functional nodes 804 semantically represent a tax concept and may be calculated or otherwise determined using a function 806. Functional node 804 and the associated function 806 define a particular tax operation. For example, as seen in FIG. 8, operation refers to total wage income and is the result of the accumulator function 806 summing all W-2 income from leaf nodes 802. Functional node 804 may include a number in some instances. In other instances, the functional node 804 may include a response to a Boolean expression such as "true" or "false." The functional nodes 804 may also be constant values in some instances. Some or all of these functional nodes 804 may be labelled as "tax concepts" or "tax topics." The combination of a functional node 804 and its associated function 806 relate to a specific tax operation as part of the tax topic.

Interconnected function nodes 804 containing data dependent tax concepts or topics are associated with a discrete set of functions 806 that are used to capture domain specific patterns and semantic abstractions used in the tax calculation. The discrete set of functions 806 that are associated with any particular function node 804 are commonly reoccurring operations for functions that are used throughout the process of calculating tax liability. For example, examples of such commonly reoccurring functions 806 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 806 that is used to compute or calculate a tax liability is stored within a data store 810 which in some instances may be a database. The various functions 806 that are used to semantically describe data connections between function nodes 804 can be called upon by the tax preparation software for performing tax calculations. Utilizing these common functions 806 greatly improves the efficiency of the tax preparation software can be used by programmer to more easily track and follow the complex nature of the ever-evolving tax code. The common functions 806 also enables easier updating of the tax preparation software because as tax laws and regulations change, fewer changes need to be made to the software code as compared to prior hard-wired approaches.

Tax calculation graph 482 and the associated function nodes 804 and functions 806 can be tagged and later be used or called upon to intelligently explain to the user the reasoning behind why a particular result was calculated or determined by the tax preparation software program as explained in more detail below. The functions 806 can be de-coupled from a specific narrow definition and instead be associated with one or more explanations. Examples of common functions 806 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Function 806 may also include any number of mathematical or other operations. Examples of functions 806 include summation, subtraction, multiplication, division, and comparisons, greater of, lesser of, at least one of, calling of look-ups of tables or values from a database 810 or library as is illustrated in FIG. 8. It should be understood that the function nodes 804 in the tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 804 may be found in multiple locations within the tax calculation graph 485. Taxable income is another example of such a function node 804

Figure 9A:
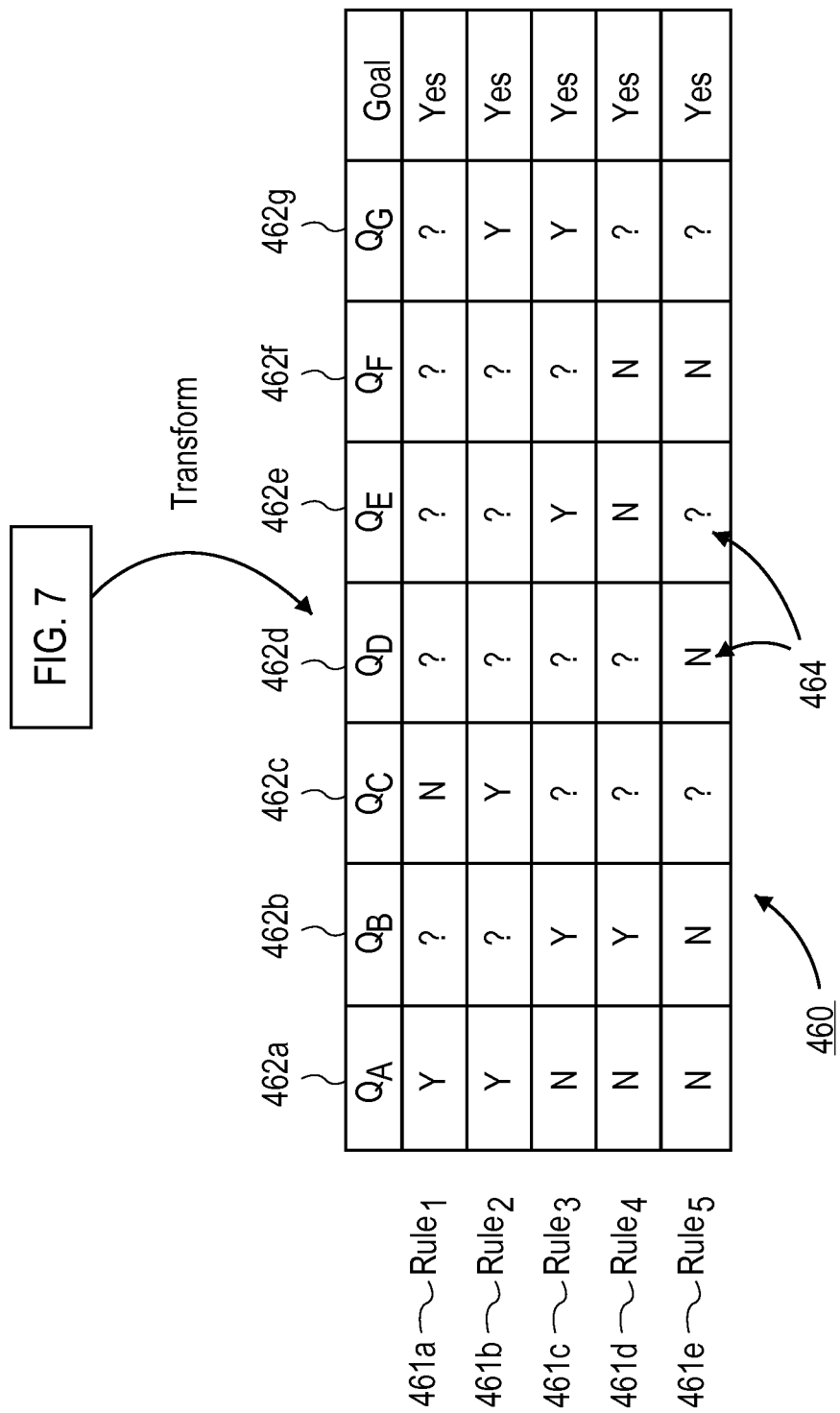
FIG. 9A illustrates a decision table based on or derived from a completeness graph of FIG. 7.

Referring to FIG. 9A, decision table 460 shown in FIG. 9A reflects the question-and-answer flow of completeness or directed graph 465. In the illustrated example, rows of decision table 460 define rules 461a-e (e.g., Rules R1-R5 as shown in FIG. 9A), and columns of the decision table 460 indicate questions 462a-g (Q1-Q5 shown in FIGS. 4A-B, or Questions A-G shown in FIGS. 9A-B). During processing, decision table 460 is scanned by tax logic agent 410 to determine which answers 464 or which aspects of a rule 461 or condition elements are included in received runtime data 442. Tax logic agent 410 determines how much the runtime data 442 completes decision table 460, or which conditions or questions 462 remain unanswered or unsatisfied, and determines or selects candidate questions 462 to be presented to user.

Tax logic agent 410 uses decision tables 460 to analyze runtime data 442 and determine whether a tax return is complete. Each decision table 460 created for each topic or sub-topic is scanned or otherwise analyzed to determine completeness for each particular topic or sub-topic. In the event that completeness has been determined with respect to each decision table 460, then the rule engine 412 outputs a "done" instruction to UI controller 430. If rule engine 412 does not output a "done" instruction that means there are one or more topics or sub-topics that are not complete, which, as explained in more detail below, presents interview questions to a user for answer. Tax logic agent 410 identifies decision table 460 corresponding to one of the non-complete topics or sub-topics and, using the rule engine 412, identifies one or more non-binding suggestions 411 to present to UI controller 430. Non-binding suggestions 411 may include a listing of compilation of one or more questions from one or more decision tables 460.

The following pseudo code generally expresses how a rule engine 412 functions utilizing a fact cache based on the runtime canonical data 442 or the instantiated representation of the canonical tax schema 446 at runtime and generating non-binding suggestions 411 provided as an input to UI controller 430. As described in U.S. application Ser. No. 14/097,057 incorporated herein by reference, data such as required inputs can be stored to a fact cache so that the needed inputs can be recalled at a later time, and to determine what is already known about variables, factors or requirements of various rules.

Rule engine (412)/Tax Logic Agent (TLA) (410)
  // initialization process
  Load_Tax_Knowledge_Base;
  Create_Fact_Cache; While (new_data_from_application)
    Insert_data_into_fact_cache;
      collection=Execute_Tax_Rules; // collection is all the fired rules and corresponding conditions
      suggestions=Generate_suggestions (collection);
    send_to_application (suggestions);

In one embodiment, as shown in FIG. 9B, statistical data 463 (which may be appended as columns to the rule-question decision table 460 shown in FIG. 9A, may be received from or based on data collected by statistical/life knowledge module 490 described in further detail below) indicates how likely a question or topic 462 is to be relevant to a user given a set of runtime data 442 and may be utilized by rule engine 442 when determining which candidate question or topic 462 to select.

Instead of, or in addition to, statistical data 463/490, embodiments may also involve tax logic agent 410 executing one or more predictive models 493 for purposes of determining how likely a question or topic is to be relative to a given user based on input runtime data 442. Examples of predictive models that may be utilized for this purpose include predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 460 may include columns that contain statistical data 463 in the form of percentages. Column (STAT1 shown in FIG. 9B) may contain a percentage value that indicates taxpayers under the age of thirty-five where $Rule_1$ is satisfied. Another column (STAT2 shown in FIG. 9B) may contain a percentage value that indicates taxpayers over the age of thirty-five where $Rule_1$ is satisfied. Any number of additional columns could be added to the decision table 460 and the statistics 463 do not have to relate to an age threshold or grouping. Statistical data 463 may be used, as explained in more detail below, by the tax return preparation application to determine which of the candidate questions ($Q_A$-$Q_G$) 462 should be selected by tax logic agent 410 for presentation to or asked of user. Statistical data 463 may be compared to one or more known taxpayer data fields (e.g., age, income level, tax filing status, geographic location, or the like) such that the question that is presented to the user is most likely to lead to a path to completion. Candidate questions 462 may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Tax logic agent 410 may also receive or otherwise incorporate information from statistical/life knowledge module 490. Statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters. Tax logic agent 410 may use this knowledge to weight particular topics or questions related to these topics when processing rules 461 and questions 462 and generating non-binding suggestions 411.

Non-binding suggestions 411 generated by tax logic agent 410 may be, for example, a question, declarative statement, identification of a topic and may include a ranked listing of suggestions 411. Ranking 418 may be weighted in order of importance, relevancy, confidence level, or the like. According to one embodiment, statistical data or results generated by predictive models may be incorporated by tax logic agent 410 to be used as part of the candidate question ranking 418 which, in turn, may be used by tax logic agent 410 to assign a ranking to the non-binding suggestions 411 generated by tax logic agent 410.

For example, questions 462 about home mortgage interest may be promoted or otherwise given a higher weight for users in particular zip codes or income levels. Statistical knowledge 490 or results generated by execution of predictive models may apply in other ways as well.

For example, tax forms often require a user to list his or her profession. These professions may be associated with transactions that may affect tax liability. For instance, a taxpayer may list his or her occupation as "teacher." Statistic/life knowledge module 490 may contain data that shows that a large percentage of teachers have retirement accounts, and in particular, 403(b) retirement accounts. This information may then be used by tax logic agent 410 when generating its non-binding suggestions 411. For example, rather than asking generically about retirement accounts, the non-binding suggestion 411 can be tailored directly to a question about 403(b) retirement accounts. According to one embodiment, candidate question scoring 418 and ranking 418 is used to select candidate questions 462 to use to generate a non-binding suggestion 411, and according to another embodiment, ranking 418 is also used to impose a ranking of non-binding suggestions 411 themselves for reference by UI controller 430.

Data that is contained within statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by statistic/life knowledge module 490. This information may be periodically refreshed or updated to reflect the most up-to-date relationships. Generally, data contained in statistic/life knowledge module 490 is not specific to a particular tax payer but is rather generalized to characteristics shared across a number of tax payers although in other embodiments, the data may be more specific to an individual taxpayer.

In one embodiment, rule engine 412 reads runtime data 442 and uses runtime data 442 as answers or inputs to decision table 460 to eliminate rules 461 and questions 462 from consideration. Thus, a user is not required to step through each of these eliminated questions or questions including eliminated questions of a pre-determined question sequence in order to conclude whether a particular questions or a tax situation or topic applies to the user.

For example, referring to FIG. 10, and continuing with the example of decision table 465 shown in FIG. 9A, runtime data 442 that is known is used to determine which rows or rules 461 to cross out in the decision table 460. In the illustrated example, if it is known from runtime data 442 that the answer to Question A is "Y" then rules 461 R3-R5 involving a "N" answer to Question A are not applicable. As a result, these rows or rules 461 of decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462 that require answers based on the current runtime data 442 include Questions C and G. Thus, rule engine 412 uses decision table 460 to select one or more rules 461 and determine or select one or more candidate questions 462 that are unanswered in view of current runtime or instance data 442 and that should be presented or asked of the user to proceed to completion.

Tax logic agent 410 provides to UI controller 430 non-binding suggestion 411 comprising a selected question or topic 461 to be addressed. In the illustrated embodiment, UI controller 430 includes a UI or user experience manager 436 that determines how to process the non-binding suggestions 411 with selected questions or topics 461 and generates an interview screen or coordinates with a generator element to select or generate interview screen 432 of the UI based on the question or topic 461 of the non-binding suggestion 411. UI controller 430 may include suggestion resolution element, a generator element, and an interview screen management element or flow/view management" module as described in U.S. application Ser. No. 14/206,834, filed Mar. 12, 2014, entitled "Computer Implemented Methods Systems and Articles of Manufacture for Suggestion-Based Interview Engine for Tax Return Preparation Application, previously incorporated herein by reference. For ease of explanation and illustration, reference is made generally to UI or interview screen 432 or a generator 432 thereof Suggestion resolution element, as described in incorporated U.S. application Ser. No. 14/206,834, is responsible for resolving the strategy of how to respond to incoming non-binding suggestions 441 provided by tax 410 logic agent. For this purpose, a suggestion resolution element may be programmed or configured or controlled by configuration files 433 that specify whether, when and/or how non-binding suggestions 411 are processed (e.g., priority, sequence, timing, in a current, next or subsequent interview screen, random, never or ignore, not until additional data received or other tax forms are completed). For ease of explanation, reference is made generally to UI controller 430 and interview screen 432 generated thereby.

For example, configuration file 433 for UI controller 430 may specify one or more or all of how to process non-binding suggestion 411 based on whether to consider or ignore non-binding suggestion 411, when non-binding suggestion 411 should be processed, content of interview screen 432 based on non-binding suggestion 411, how to present content or interview screens 432 based on non-binding suggestion 411 in view of a form factor or type of a computing device utilized by the user of the tax preparation application or that executes the tax return preparation application embodying system components described above, which non-binding suggestion(s) 411 have priority over others or a sequence of non-binding suggestions 411, which UI controller configuration files 433 have priority over others or a sequence of configuration files 433 in the event that multiple UI controller configuration files 433 may potentially be used for purposes of configuration conflict resolution. For example, a UI controller configuration file 433 may specify that a non-binding suggestion 411 should be processed or addressed immediately or on the spot, next, at a later time, after certain or other additional tax return data has been received, or at the end of the process. UI controller configuration files 433 may also specify whether non-binding suggestions 411 should be processed individually or aggregated for processing as a group with resolution of any priority issues. As another example, a UI controller configuration file 433 may specify that content should be adjusted or whether or how non-binding suggestions 411 should be processed in view of a screen size or dimension of a type of computing device that executes the tax preparation application since questions or more content may be more suitable for computing devices such as laptop and desktop computers, which have larger screens than smaller mobile communication devices such as smartphones.

UI controller 430 generates the resulting user interaction or experience or creates or prepares an interview screen 432 or content thereof based on a library of visual assets such as pre-programmed interview screens or interview screens that are templates and that can be populated by UI controller 430 with a question 462 or topic of non-binding suggestion 411.

With continuing reference to FIGS. 4A and 8, tax calculation engine 480 reads current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by tax logic agent 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, tax calculation engine 480 will run calculation graphs 482 again to calculate a new AGI value, which would then be stored to shared data store 440.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. A smart tax logic agent 410 running on a set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

According to one embodiment, non-binding suggestion 411 ranking by ranking module 413 as shown in FIG. 4A is based at least in part an attribute of a decision table 460 such as an attribute of at least one active rule 461 of respective decision tables 460. The attribute may involve an active rule 461 itself or a question 462 that is to be answered and utilized for a rule 461. Thus, an attribute of a decision table 460 or of at least one active rule 461a is defined to include attributes of one or more rules 461 (e.g., how many questions 462 remain unanswered for a rule 461, the number of active rules 461 within a decision table 460) or attribute of a question 462 or answer that impacts whether a rule 461 remains active or provides an input for an outstanding condition of the rule 461 to determine a conclusion or completeness determination.

For example, according to one embodiment, suggestion scoring or ranking module 413 is programmed or configured such that a non-binding suggestion 411 that includes one or more candidate questions 462 selected from a decision table 460 based on runtime data 442 read from data store 440 that includes inferred or assumption data, e.g., as determined by a default or assumption module of UI controller 430, or by an inference module of tax logic agent 410, and written to shared data store 440, is prioritized or ranked 418 higher than other non-binding suggestions 411 that do not include candidate questions 462 selected based in part upon inferred or assumption data. According to one embodiment, in the event that multiple non-binding suggestions 411 include candidate questions 462 based on assumed or inferred data, they can both be assigned the same ranking (e.g., if ranking is based on a ranking level rather than an order) or the same category (as a "maybe" or "possible" question as described in further detail below), and if a rank order is utilized, then the ranking module 413 may use additional ranking criteria to determine which of the suggestions 411 should be ranked higher than the other. For example, a non-binding suggestion 411 that includes the most candidate questions 462 based on assumed or inferred data can be ranked above others. According to another embodiment, the degree or level of inference is considered by the ranking module 413 such that a non-binding suggestion 411 that includes a candidate question 462 selected based on a first level of inference or assumption is ranked higher than a non-binding suggestion 411 that includes a candidate question 462 that was selected based on a deeper level of inference or assumption.

For example, based on runtime data 442 of the user's zip code, it may have been inferred, by a default or inference module of UI controller 230 and as reflected in runtime data 442, or by inference module 416 of tax logic agent 410, that the user owns a home, and based on this inferred answer a first non-binding suggestion 411 may include a candidate question 462 based on the inferred answer being an input or answer to a question of a decision table 460. Other aspects of utilizing a default or inference module, which may be a component of UI controller 230 or of tax logic agent 410 as shown in FIG. 4A, and making inferences about what topics or questions apply to a user are described in U.S. application Ser. No. 14/448,678, filed Jul. 31, 2014, entitled "COMPUTER IMPLEMENTED METHODS SYSTEMS AND ARTICLES OF MANUFACTURE FOR PREPARING ELECTRONIC TAX RETURN WITH ASSUMPTION DATA, the contents of which were previously incorporated by reference herein.

Thus, this inference determination generates a "maybe" question, or a question that is currently categorized as "non-required" in that the question or topic might apply, in contrast to a question that is "required" to be answered based on the runtime data 442 answers to questions 462 of decision table 460. A second suggestion 411 may include a candidate question 462 based on additional assumptions or inferences or assumptions or inferences that extend beyond the level of those used to determine the first suggestion 411. For example, based on the zip code, the inference module 416 may determine that it is likely that the user has a certain income, and further determine that based on the income, the user likely has stocks, and further determine that it is thus likely that the user has a 1099-DIV. Thus, while statistics 463/490 or results generated by execution of predictive models may identify "maybe" questions or questions that indicate that both of the assumptions or inferences are likely to determine the inferred or assumed data, one suggestion 411 may be ranked 418 higher than another non-binding suggestion 411 given how many assumptions or inferences were made to select a candidate questions 462 that are the subject of respective suggestions 411.

According to another embodiment, non-binding suggestion ranking 418 is based on how many candidate questions 462 are included in a non-binding suggestion 411. Thus, for example, runtime data 442 may include answers to more questions 462 of a first decision table 460-1 such that a first suggestion 411-1 based on the first decision table 460-1 includes a first number of candidate questions 462, whereas the runtime data 442 includes answers to fewer questions of a second decision table 460-2 such that the second suggestion 411-2 based on the second decision table 460-2 includes a second number of candidate questions 462 that is greater than the first number of candidate questions 462. Thus, for example, if only one or a few candidate questions 462 are selected as needing answers in order to satisfy all of the conditions or inputs of a rule 461, a conclusion or state of completeness for that topic can be reached more quickly compared to when more questions would need to be answered. Thus, based on the number of candidate questions 462 to be answered for completeness for a topic, a suggestion 411 that includes a number of questions that is less than the number of candidate questions 462 of other suggestions 411 can be ranked 418 higher than the other suggestions 411 to indicate to the UI controller 430 that the higher ranked suggestion 411 may be processed before others, thus possibly achieving completeness for that topic faster than would otherwise occur if no ranking 418 were utilized or if other suggestions 411 were processed instead. The suggestion ranking 418 may be based on the number of candidate questions 462 or the number of candidate questions 462 relative to the total number of questions 462 of a decision table 460.

For example, if two decision tables 460-1 and 460-2 each has 10 questions, a first suggestion 411-1 includes information about three candidate questions 462, whereas a second suggestion 411-2 includes seven candidate questions 462, then the ranking module 413 may prioritize the first suggestion 411-1. As another example, if a first decision table 460-1 has 10 total questions 462, and a second decision table 460-2 has 30 total questions, a first suggestion 411-1 based on the first decision table 460-1 and that includes eight candidate questions 462 (80% of the total number of questions) may be ranked 418 lower than the second suggestion 411-2 that includes 15 candidate questions (50% of the total number of questions) since the processing a suggestion 411 with a lower ratio of candidate questions to total number of questions indicates a higher likelihood that processing that suggestion may result in proceeding to a conclusion or completeness for the decision table 460 topic more quickly, or making more progress toward a conclusion or completeness for the decision table topic.

According to yet another embodiment, suggestion ranking 418 is based at least in part upon how many active rules 461 remain given the current runtime data 442. Thus, runtime data 442 may have include answers to more questions 462 of a first decision table 460-1 such that a first suggestion 411-1 based on the first decision table 460-1 includes a first number of candidate questions 462 for a first number of active rules 461, or rules for which answers are still required, whereas the runtime data 442 includes answers to questions for a second number of active rules 461 that is less than the first number of active rules 461 such that the first suggestion 411-1 is ranked higher than the second suggestion 411-2. For example, if a first decision table 460-1 and a second decision table 460-2 each has 15 rules, a first suggestion 411-1 includes questions involving eight active rules 461 of the first decision table 460-1, whereas a second suggestion 411-2 includes candidate questions involving 10 active rules 461-2, then the first suggestion 411-1 is ranked higher than the second suggestion 411-2. As another example, if a first decision table 460-2 has 25 total rules, and 5 active rules 461a that are used to select candidate questions 462, whereas a second decision table 460-2 has 30 total rules and 10 active rules 461 that are used to select candidate questions 462, then the first suggestion 411-1 is ranked higher than the second suggestion 411-2 since the first suggestion 411-1 includes candidate questions 462 for the first decision table 460-1 in which 5/25, or 20%, of the total rules 461 are active rules 461, whereas the second suggestion 411-2 includes candidate questions 462 for a second decision table 460-2 in which 10/30 or 33% of the total rules 461 are active rules 461. Thus, as rules 461 are eliminated in view of the runtime data 442, or fewer rules are active, it is more likely that an answer to a candidate question 462 will satisfy rule conditions and a resulting in a conclusion or completeness for that particular decision table topic.

Further, as illustrated in FIG. 4A, in certain embodiments, suggestion ranking engine 413 determines priority or ranking criteria from a configuration file 419 read or executed by tax logic agent 410 to determine how suggestions 411 should be ranked. According to one embodiment, configuration file 419 for tax logic agent 410 or ranking module 413 (and the configuration file 433 for UI controller 430) can be modified or updated by an administrator or host of the tax return preparation application, and change to configuration file 419 for ranking module 413 can be used to modify how ranking or priorities are implemented. This may be done on the fly without having to change other system components given the modular configuration of the system.

With continuing reference to FIG. 4A, and with further reference to FIG. 4B, certain embodiments may involve generating non-binding suggestions 411 based at least in part upon a scoring, ranking and/or categorization of a candidate question. Tax logic agent 410 may include or utilize a categorization module, which his used to generate one form of prioritization data 414 in the form of a category of candidate questions 462. Examples of categories that may be utilized include "required" questions or questions that must be answered or address to satisfy a requirement of a tax authority or to complete the electronic tax return or topic as determined from questions of decision table 460, and other non-required questions, or "possible" or "maybe" questions that are identified as being possibly required based on current runtime data 442 and other data such as one or more of statistical data, results generated by predictive models, or external sources such as data of the user's account with an online social networking service, or default or assumption data that is determined about the user without the user providing the data.

As an example of a "possible" or "maybe" question, if current runtime data 442 may indicate that the user of the tax return preparation application is 20 years old, and statistical data 463/490 of other taxpayers or other users of the tax return preparation application may indicate that the user is likely to be claimed as a dependent by the user's parent, and more likely to be claimed as a dependent if the user is also a student. Thus, an assumption or inference can be made that that the user is a dependent, and a non-binding suggestion 411 including a candidate question 462 for this decision table 460 topic may be ranked higher than other non-binding suggestions 411 given the "educated guess" based on current runtime data 442 and statistical data 463/490. This may be categorized as a "maybe" question. As another example, if the user's account with a professional online social networking website as determined from electronic source 450 indicates that the user has a new job (e.g., as indicated in a profile of an account the user has with linkedin.com), an inference or assumption may be made by inference module 416 and/or by UI controller 430 that the user may have deductible expenses associated with the new job, such as moving expenses. Thus, an assumption or inference can be made that that the user has job-related deductions, and a non-binding suggestion 411 including a candidate question 462 for this decision table 460 topic may be ranked higher than other non-binding suggestions 411 given the "educated guess" based on the current runtime data 442, the user's online social network data 450 and statistical data 463/490, which may also be validated or confirmed by the user. This may also be categorized as a "possible" or "maybe" question.

Referring to FIG. 4B, in one embodiment, and as described in further detail in U.S. application Ser. No. 14/461,982, filed Aug. 18, 2014, entitled COMPUTER IMPLEMENTED METHODS SYSTEMS AND COMPUTER PROGRAM PRODUCTS FOR CANDIDATE QUESTION SCORING AND RANKING DURING PREPARATION OF ELECTRONIC TAX RETURN, the contents of which were previously incorporated herein by reference, individual candidate questions 462 are scored 417 and ranked 418, based on question categorization 414 and/or a score 417.

In the illustrated embodiment, tax logic agent 410 includes or utilizes a combination of tax logic, e.g., as expressed in decision tables 460, and a data source other than tax logic or decision tables 460 such as statistics 463/490 or a result generated by a predictive model executed by tax logic agent 410. In the illustrated embodiment, score or rank module or generator 413 (score generator 413 as shown in FIG. 4B) utilizes tax logic in the form of determining possible answers 464 to candidate questions 462, and in particular, how many questions 462 could be eliminated assuming a possible answer 464 (as shown in FIG. 9A), in conjunction with data of an answer probability, which may be based on statistics 463/390 data or an output generated by a predictive model. Candidate questions 462 scores 417 are used by tax logic agent 410 to prioritize the candidate questions 461 for when non-binding suggestions 411 are generated for UI controller 430.

More specifically, according to one embodiment, tax logic agent 410 reads runtime data 442 from shard data store 440, uses or scans decision table(s) 460 given current runtime data 442 to select candidate questions 462 based on the current state of completeness of tax return and for tax topics or questions 462 of the tax return need to be filled in or completed, and determines a likelihood or probability of the possible answers 464 to the candidate questions 461. Tax logic agent 410 may maintain and update a table or other data structure with the determined data. According to one embodiment, score generator 413 considers the likelihood or probability of a possible answer 464, and tax logic in the form of how many questions of decision table 465 would be eliminated assuming a possible answer is applied, and scores for different answers, and a score for the candidate question 462 that is based at least in part upon the scores for the different answers 464.

Thus, with the simplified example provided for purposes of explanation, each of a first candidate question 461$c$-1 and a second candidate question 461$c$-2 may be possible answers 464-1 and 464-2 of "True" or "False" or "Yes" and "No." For example, given the runtime data 442 indicating that the user has two children, statistical data 463/490 may indicate that the likelihood that the user has deductible child care expenses if 65%, whereas the likelihood that there are none is 35%. Of course, it will be understood that this topic and the statistical provided are provided for purposes of explanation, not limitation.

A candidate question 462 may have two possible binary answers 464 as in this example, or other numbers and types of answers. For example, a candidate question 461 have possible answers that are numerical answers rather than binary T/F answers. Possible answers 464 may be specified, e.g., as according to schema 446, as being a particular number (e.g., 0, 10, 50), or a range of numbers (e.g., ages 1-18, 19-24, 25-62, etc.). For example, based on statistical data, 463/490 if a user has an income greater than $150,000, and lives within certain cities or zip codes, tax logic agent 410 may determine that there is 85% probability that the user owns a home and will have a property tax deduction. As another, based on statistical data 463/490, tax logic agent 410 may determine that there is a 75% probability that a person of age 19 and that is a student is claimed as dependent by someone else, whereas there is a 5% probability that a person of age 60 is claimed as a dependent by someone else. Thus, there may be two, three, five, ten or other numbers of possible answers depending on the candidate question 462, the types of data that can be used to answer a candidate question 462, and the answer options for the candidate question 462.

For ease of explanation, reference is made to a candidate question 462 having two possible answers in the form of "T/F" or "Y/N" possible answers, but it will be understood that embodiments are not so limited. Further, while embodiments are described with reference to a candidate question 462 being selected from a decision table 460, it will be understood that candidate questions 462 can be selected from various decision tables 460 for various tax topics and questions such that certain candidate questions 461 are from one decision table 460, others from one or more other decision tables 460.

Tax logic agent 410 may also assign a default likelihood or probability value, or determine a default value or probability for the possible answers. According to one embodiment, the default probability is 50%, i.e., 50% likelihood that answer 464 to a candidate question 462 is "True" and 50% likelihood that answer 464 to candidate question 462 is "False" in order to provide the lowest margin of error. If statistical data 463/490 is later received for a particular answer 464 that has been assigned a default probability value, statistical data 463/490 can update or replace the default probability value. For ease of explanation, reference is made statistical data 463/490 being available for each possible answer 464.

According to one embodiment, tax logic agent 410 determines uses decision table 460 and first answer 464-1 as hypothetical answer to determine how many other questions 462 of the decision table 460 can be eliminated, or determining an indicator of how many questions 462 would be eliminated, when the answer 464 to candidate question 462 is the first answer, and how many other questions 462 would be eliminated when the answer to the candidate question 462 is the second answer. This may involve the count or number of questions 462 of the decision table 460 that could be eliminated (e.g., 2 questions, 8 questions, 20 questions). In other embodiments, step 1108 involves an indicator of question 462 elimination expressed in terms of a ratio. According to embodiments, the ratio may be a ratio of (questions that could be eliminated)/(total number of questions in the decision table) or a ratio of (questions that could be eliminated)/(total number of questions in the decision table that are still active), such that higher ratios indicate a larger number of questions 462 that can be eliminated. For ease of explanation, reference is made to a number of questions 462 of decision table 460 that could be eliminated 462.

Continuing the general example in decision table 460 shown in FIG. 9A, if a first hypothetical answer to question A is "yes" (as indicated by the two "Y" entries being circled in the first column for Question A identified by arrow), then this results in the rules of the bottom three rows (for which the answer to question A is "N") as being inapplicable such that they are "crossed out" 1410 or eliminated from consideration by tax logic agent 410 for this simulation. Then, analyzing Questions B-G (since Question A is the question being analyzed), the decision table 465 shows "don't care" or "?" entries for questions B, D, E and F, such that these questions 462e would be eliminated if the answer to question Q is "Y" thus leaving candidate questions C and G. Thus, with this simulation, tax logic agent 410 determines four questions (B, D, E and F) could be eliminated assuming the answer to Question A is "Y". If a ratio were utilized instead, the ratio may be (4 questions eliminated)/(7 total questions of the decision table), or since question A has been answered such that only 6 questions are active, then the ratio would be (4 questions eliminated)/(6 active questions of the decision table). Tax logic agent 410 may then update a table with the question elimination data resulting from the "N" answer 464-1 simulation.

Having determined the probability of what the answer to a candidate question 462 may be and how many questions 462 could be eliminated assuming the different possible answers 464, tax logic agent 410 generates scores 417-1 and 417-2 (generally, score 417) for first and second possible answers 464-1, 464-2 to a candidate question. According to one embodiment that involves both an answer probability and tax logic attributes, e.g., in the form of a number of questions that could be eliminated, a score 417 for a possible answer 464 to a candidate question 462 is determined by: Possible Answer Score=(Probability of Possible Answer x # Eliminated Questions Assuming Possible Answer).

Thus, as an example in which there are two possible answers 464 (True or False) to Question A, and the decision table 460 determined from statistics 463/490 that the likelihood of Question A being answered "True" was 70% or 0.7, and doing so would eliminate four questions 462, then the score 417 for that possible "True" answer would be (0.7)*(4)=2.8. As another example, for the possible "False" answer, the decision table 460 determined from statistics 463/490 that the likelihood of Question A being answered "False" is 30% or 0.3, and doing so would eliminate eight questions 462, then the score 417 for that possible "False" answer would be: (0.3)*8=2.4. Thus, in this example, the score 417-1 for possible the "True" answer is higher than the score 417-2 for the "False" possible answer as a result of the higher probability based on the statistics 463/490, even though more questions 462 could be eliminated if the answer were "False." It will be understood that the opposite scenario may result from the score determination, e.g., if a False answer would result in elimination of a higher number of questions 462, e.g., 10 questions, such that the resulting score 417 for a possible "False" answer would be: (0.3)*10=3.

While the above example involves equal weighting of the probability and question elimination factors, other embodiments may involve weighting probability more than question elimination, or weighting question elimination more than probability. For example, if the probability of an answer factor is weighted 75%, and question elimination factor is weighted 25%, and the likelihood of Question A being answered "True" was 70% or 0.7, and doing so would eliminate four questions 462e, then the score 417 for that possible "True" answer 464-1 would be [(0.7)*(4)]*0.75=2.1, whereas the score 417 for the possible "False" answer 464-2 would be [(0.3)*8] *0.25=0.6. Thus, in this example, the weighting still results in the "True" score being scored higher than the "False" score and by a larger margin. However, if question elimination were weighted more heavily than probability, then the "False" answer would be scored higher than the "True" answer.

More specifically, if question elimination is weighted 75%, and answer probability is weighted 25%, and the likelihood of Question A being answered "True" was 70% or 0.7, and doing so would eliminate four questions 461e, then the score 417-1 for that possible "True" answer 464-1 would be [(0.7)*(4)]*0.25=0.7, whereas the score 417-2 for the possible "False" answer 464-2 that would eliminate eight questions 462 would be [(0.3)*8]*0.75=1.8. Thus, in this example, the weighting still results in the "False" score, rather than the "True" score, being scored higher.

According to another embodiment, candidate question 462 scoring may also involve tax logic agent 410 determining a composite score. A composite score for a candidate question 462 may be based on a sum or average of the individual scores 417 for the individual possible answers 464 to the candidate question 462. For example, in one embodiment that utilizes probability (0-1.0) and a ratio of questions 462 eliminated to a total number of questions or total number of active questions (also 0-1.0), such a composite score 417 based on an average will also within the range of 0-1.0. Thus, if a score 417 for a possible "True" answer to a first candidate question 462 is determined to be 0.8, and the score 417 for a possible "False" answer to that same candidate question 462 is determined to be 0.8, then the composite score 417 is also 0.8. This may occur, for example, when one score 417 for a possible answer is based on an answer being more likely to apply, whereas the other score 417 for a possible answer is based on being able to eliminate more questions. For a second candidate question 462, the individual answer scores 417 may be 0.9 and 0.1, resulting in an average or composite score 417 of 0.5 for the second candidate question 462. Thus, in this example, although one of the scores 417 for an answer 464 to the second candidate question 462 is the highest (0.9) of all answer scores 417, the first composite score 417 of 0.8 is higher than the second composite score 417 of 0.5, and this is indicative of it being likely that questions 462 may be eliminated with either answer to the first candidate question 462 given the high 0.8 numbers and resulting 0.8 average, whereas this is not the case with the second composite score 417 (0.55), as a result of the low score 417 of 0.1 for the second possible answer to the second candidate question 462.

Embodiments directed to processing prioritization data 414, which may include one or more types of categorization, scoring and ranking data of candidate questions 462 and/or non-binding suggestions 411 described above are described in further detail with reference to FIGS. 11-25.

Figure 11:
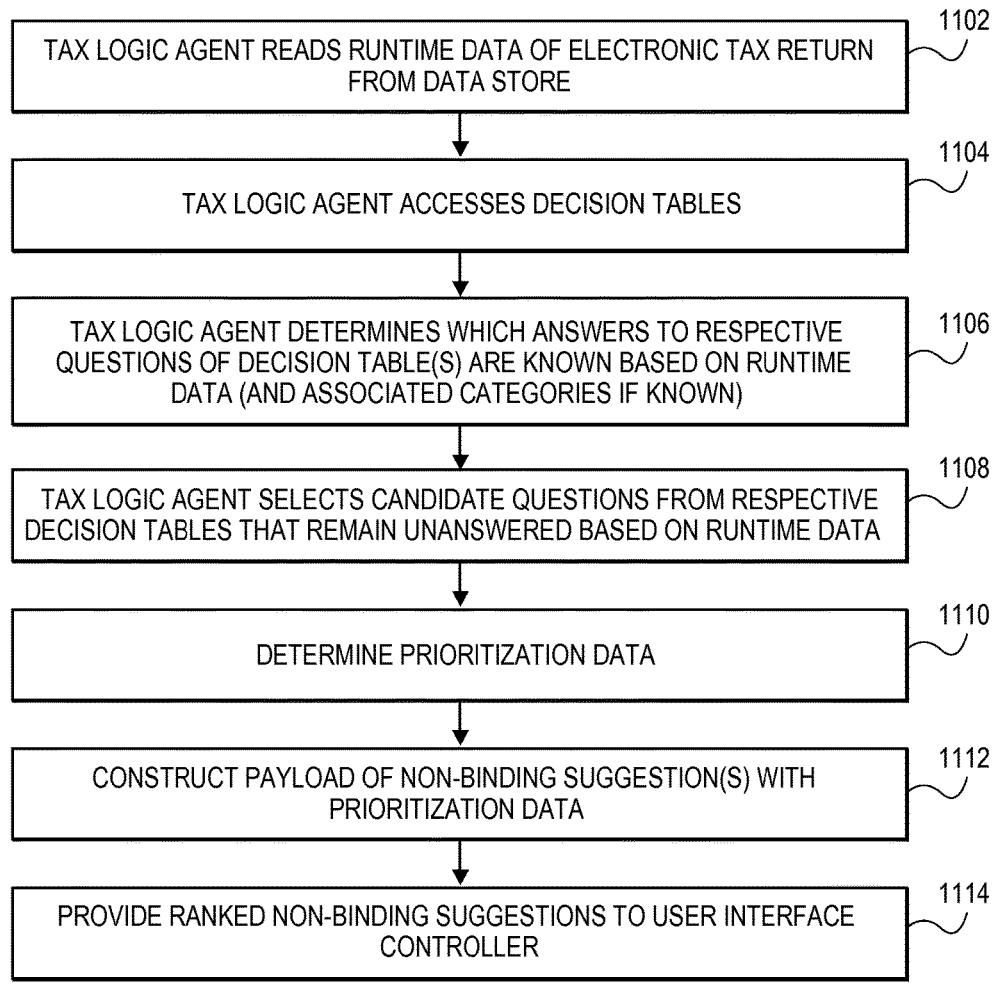
FIG. 11 is a flow diagram illustrating actions performed by a tax logic agent according to one embodiment and involving generation of non-binding suggestions including prioritization data that is to be utilized by a pagination engine of a user interface controller.

With continuing reference to FIGS. 2A-B and 4A-B, and with further reference to FIG. 11, at 1102, tax logic agent 410 reads runtime data 442 of electronic tax return from shared data store 440, and at 1104, accesses tax logic in the form of decision tables 460. At 1106, tax logic agent 440 determines which answers 464 o respective questions 462 of decision table(s) 460 are known and which questions 462 remain unanswered based on runtime data 442 (and associated categorization 417, e.g., "required" or other category such as "maybe" or "possibly relevant" which may include or cover questions 462 "inferred" to be possibly relevant based on runtime data 442 and "default" or "assumption" data. At 1108, tax logic agent 410 selects candidate questions 462 from respective decision tables 460 that remain unanswered based on runtime data 442, and determines associated prioritization or pagination data 414 (generally, prioritization data) which, as noted above, may include one or more or all of scoring, ranking and categorization data. At 1112, tax logic agent 410 constructs a payload of non-binding suggestion(s) 411 including prioritization data 414, and at 1114, provides the non-binding suggestions 411 to UI controller 420.

Figure 12:
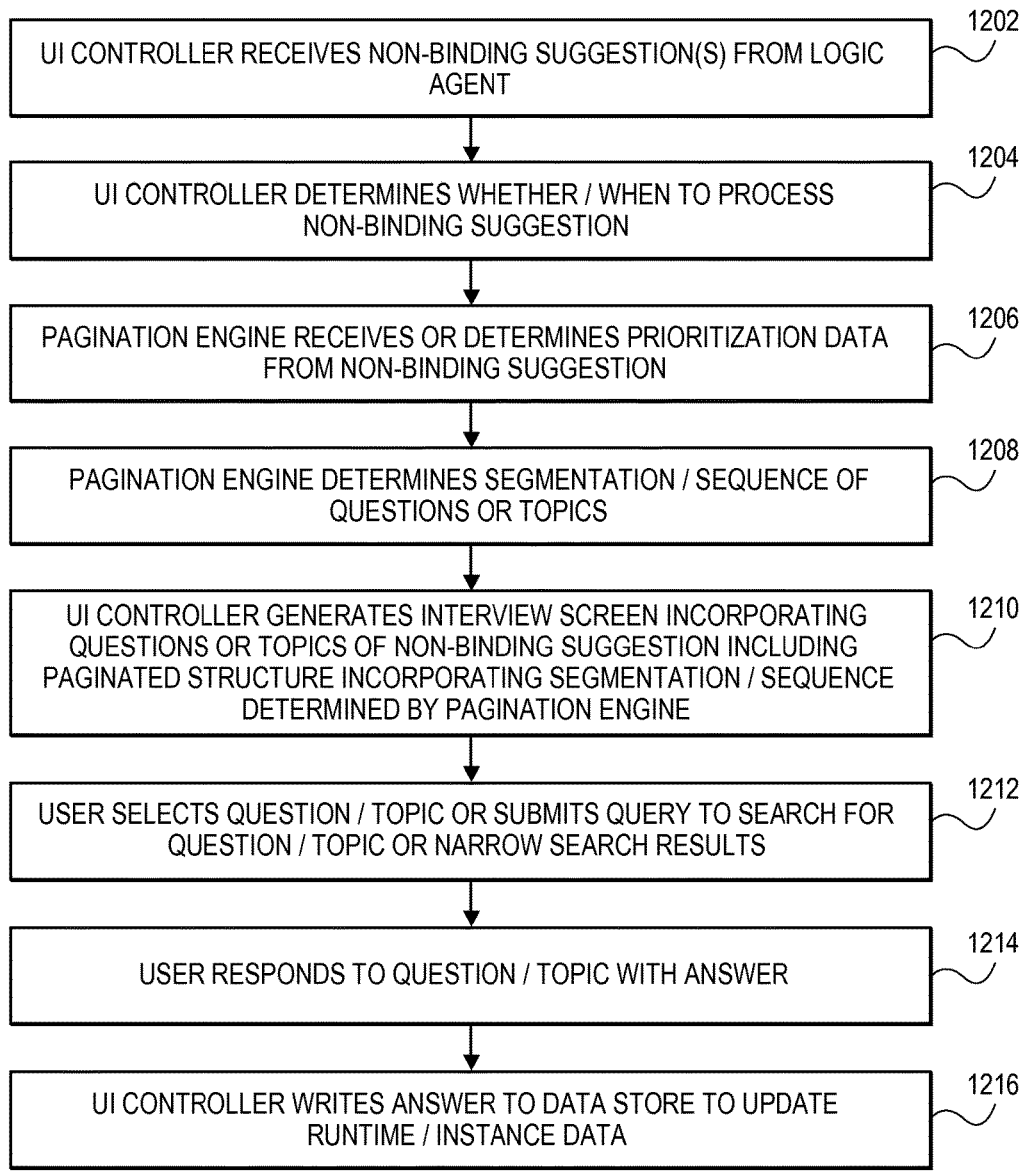
FIG. 12 is a flow diagram illustrating actions performed by a user interface controller or pagination engine thereof according to one embodiment and involving processing of non-binding suggestions including prioritization data for generating an interview screen that is structured based at least in part upon prioritization data of non-binding suggestions received from a tax logic agent.

Referring to FIG. 12, after the tax logic agent 410 has generated non-binding suggestions 411, UI controller 430 processes the non-binding suggestions 411 generated by tax logic agent 410. At 1202, UI controller 430 receives non-binding suggestion(s) 411 from tax logic agent 410 and at 1204, determines whether and/or when to select a non-binding suggestion 411 for processing. For example, as noted above and as described in various applications incorporated by reference, whether and/or when to process a non-binding suggestion 411 may be based at least in part upon a configuration file 433, whether UI controller 430 is waiting for certain tax return data has been received or a certain form or section of the electronic tax return to be completed. Whether a non-binding suggestion 411 is selected by UI controller 430 for processing may also involve the prioritization data 414, e.g., based on a suggestion ranking, by selecting the highest ranked suggestion for processing. At 1206, pagination engine 420 of UI controller 430 receives or determines prioritization data 414 from non-binding suggestion 411. As noted above, the prioritization data 417 may include score or ranking data of non-binding suggestions 411, score or ranking data of questions 462 that were selected for inclusion in respective non-binding suggestions 411 and category data 417 of questions 462. At 1208, pagination engine 420 determines a pagination or segmentation arrangement of questions 462 for selected non-binding suggestions 411. According to one embodiment, as generally illustrated in FIG. 2A discussed above, pagination engine 420 receives possible pagination structures 422, such as a sorted list or a framed screen for different scores or categories of questions 462, and also receives the prioritization data 414 to determine how a sorted list should be populated with questions or topics 462 of non-binding suggestions 411, or how a framed screen should be configured and populated with questions or topics 462 of non-binding suggestions 411.

Figure 13A:
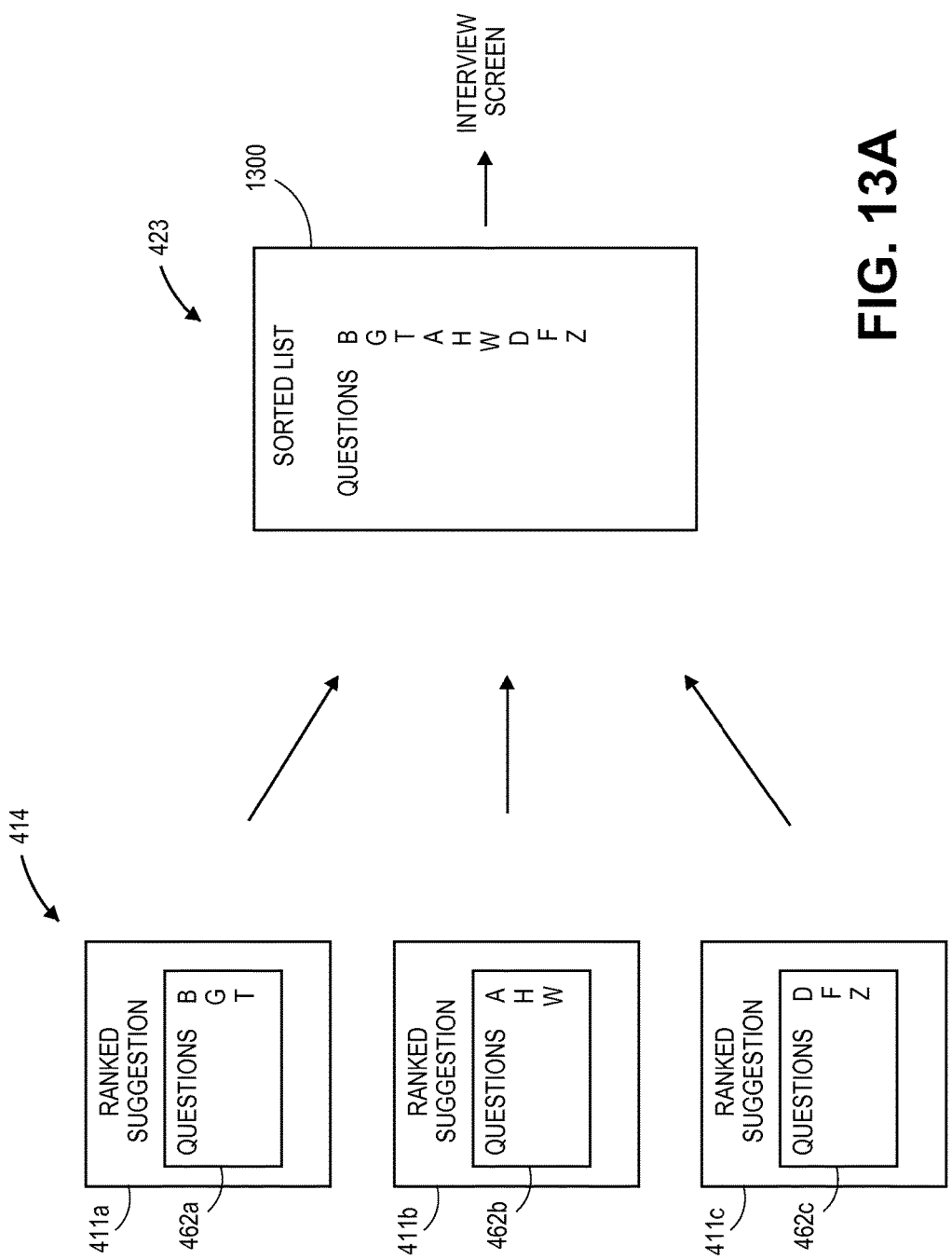
FIG. 13A illustrates one example of how prioritization data in the form of data of non-binding suggestion rankings is utilized to generate a pagination structure in the form of a sorted list and how questions or tax topics of ranked non-binding suggestions are integrated within the sorted list.

For example, referring to FIG. 13A, in one embodiment, tax logic agent 410 may generate non-binding suggestions 411 (three ranked non-binding suggestions 411*a-c* are illustrated) that include questions or topics 462 and rank the non-binding suggestions 411. The highest ranked non-binding suggestion 411*a* is shown as the first or highest suggestion 411*a*. This example involves ranking of suggestions 411 (using one of the various methods discussed above), but questions or topics 462 thereof not being individually ranked. The illustrated example involves a first or highest ranked non-binding suggestion 411*a* including Question B, Question G and Question T. Second ranked non-binding suggestion 411*b* includes Question A, Question H and Question W. Third ranked non-binding suggestion 411*c* includes Question D, Question, F and Question Z. Pagination engine 420 processes this prioritization data 414, in view of the selected or possible pagination structure 422, to determine how the pagination structure 422 will be configured and/or populated.

With a pagination structure 422 in the form of a sorted list 1300, as shown in FIG. 13A, questions 462 from ranked non-binding suggestions 462*a-c* are incorporated by pagination engine 420 into sorted list based on suggestion ranking. Thus, in the illustrated example, a sorted list 1300 is constructed by pagination engine 420 to include, from top to bottom, the following questions 462 in sequence based on the ranked non-binding suggestions 411*a-c*: Question B, Question G, Question T, Question A, Question H, Question W, Question D, Question, F and Question Z.

Figure 13B:
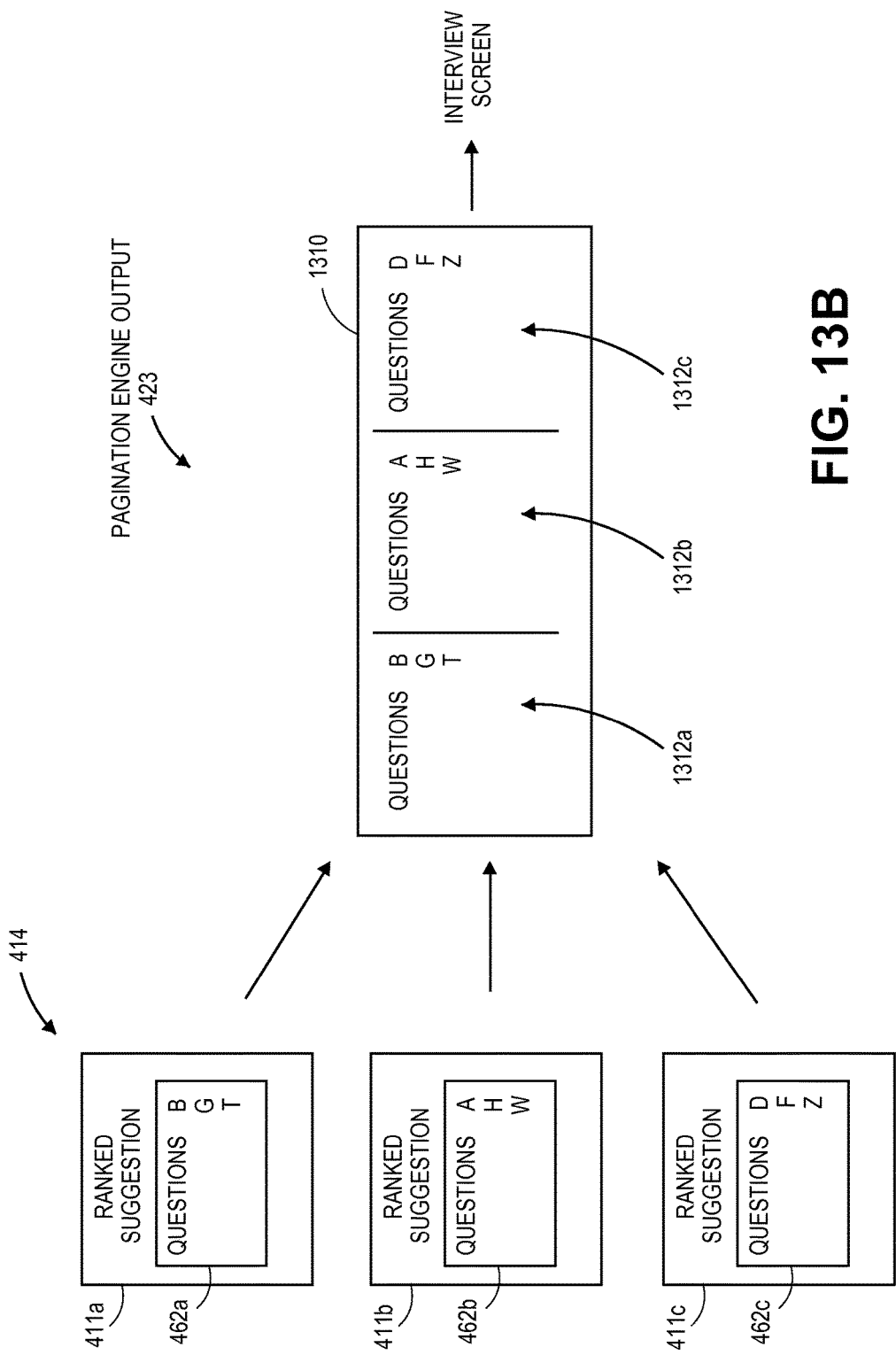
FIG. 13B illustrates one example of how prioritization data in the form of data of non-binding suggestion rankings is utilized to generate a pagination structure in the form of an interview screen including a plurality of frames or segments and how questions or tax topics of ranked non-binding suggestions are integrated within the framed or segmented interview screen.

Referring to FIG. 13B, and continuing the example shown in FIG. 13A, if a framed pagination structure 1310 including a plurality of frames or segments 1312 is utilized instead of a sorted list 1300, the pagination engine 420 populates the framed pagination structure 130 with questions 462 of non-binding suggestions 411 based at least in part upon the suggestion ranking. In certain embodiments, each framed segment 1312 may be configured to accommodate a certain number of questions 462. Thus, if the total number of questions 462 of the ranked non-binding suggestions 411 exceeds the number of questions for a segment 462, the next group of questions 462 can be included in the next or additional segment 1312. Thus, continuing with reference to the above example, if each segment 1312 of a framed pagination structure 1310 accommodates five questions 462, then pagination engine 420 generates a framed pagination structure 1300 including two frames or segments 1312, the first frame or segment 1312*a* including: unranked Questions B, G, T, A and H, the second frame or segment 1312*b* including: unranked Questions W, D, F and Z.

In certain embodiments, the user can choose to toggle between different paginated interview screen views, e.g., toggling between sorted list 1300 and framed 1310 views.

Figure 14B:
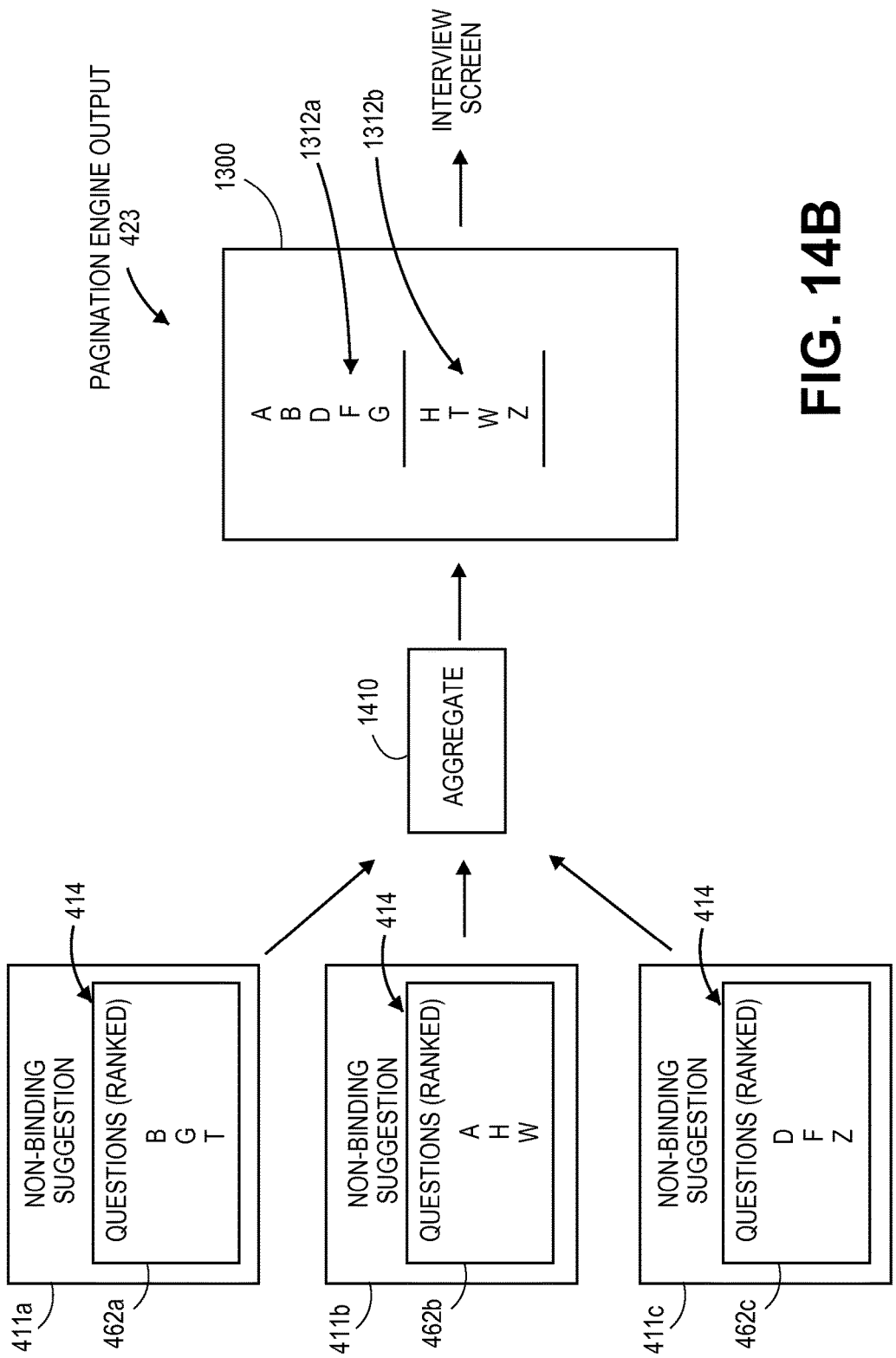
FIG. 14B illustrates one example of how prioritization data in the form of rankings of questions of non-binding suggestions is utilized to generate a pagination structure in the form of an interview screen including a plurality of frames or segments and how ranked questions or tax topics of ranked non-binding suggestions are integrated within the framed or segmented interview screen.

Referring to FIG. 14A, in another embodiment, tax logic agent 410 may generate non-binding suggestions 411, which are not be ranked, but that include questions or topics 462 that are ranked or include score data. Continuing with the above example, in non-binding suggestions 411*a-c* are now unranked rather than being ranked, and include Questions B, G, T, A, H, W, D, F and Z, pagination engine 420 may aggregate 1410 questions 462 from non-binding suggestions 411*a-c* so that question priority for the questions 462 can be determined for the collection of questions based on the ranking or score data about the questions 462 received from respective non-binding suggestions, resulting in construction of a sorted list 1300 including, from top to bottom, the following questions 462 that are ranked in sequence: A, B, D, F, G, H, T, W and Z (wherein the alphabetical designation indicates the ranking/score, or "A" being the highest ranked or scored, followed by "B" and so on. Referring to FIG. 14B, a framed paginated structure 422 including these ranked questions 462 can include a first frame segment 1412*a* including ranked questions A, B, D, F and G, whereas a second frame segment 1412*b* includes the next questions in the ranking or having the next highest scores, questions H, T, W and Z.

In embodiments involving ranked non-binding suggestions 411 that include questions or topics 462 that are also ranked or scored, or a combination of embodiments described with reference to FIGS. 13A-B and 14A-B, embodiments can be configured such that question 462 ranks or scores govern or are weighted more heavily such that question or topic 462 scoring or ranking would govern even when doing so may be contrary to suggestion 411 ranking, whereas in other embodiments, suggestion 411 ranking governs such that there may be questions 462 that emphasized or prioritized even when such questions 462 are ranked or scored lower than other questions 462 as a result of lower ranked questions 462 being included in higher ranked non-binding suggestions 411.

Figure 15A:
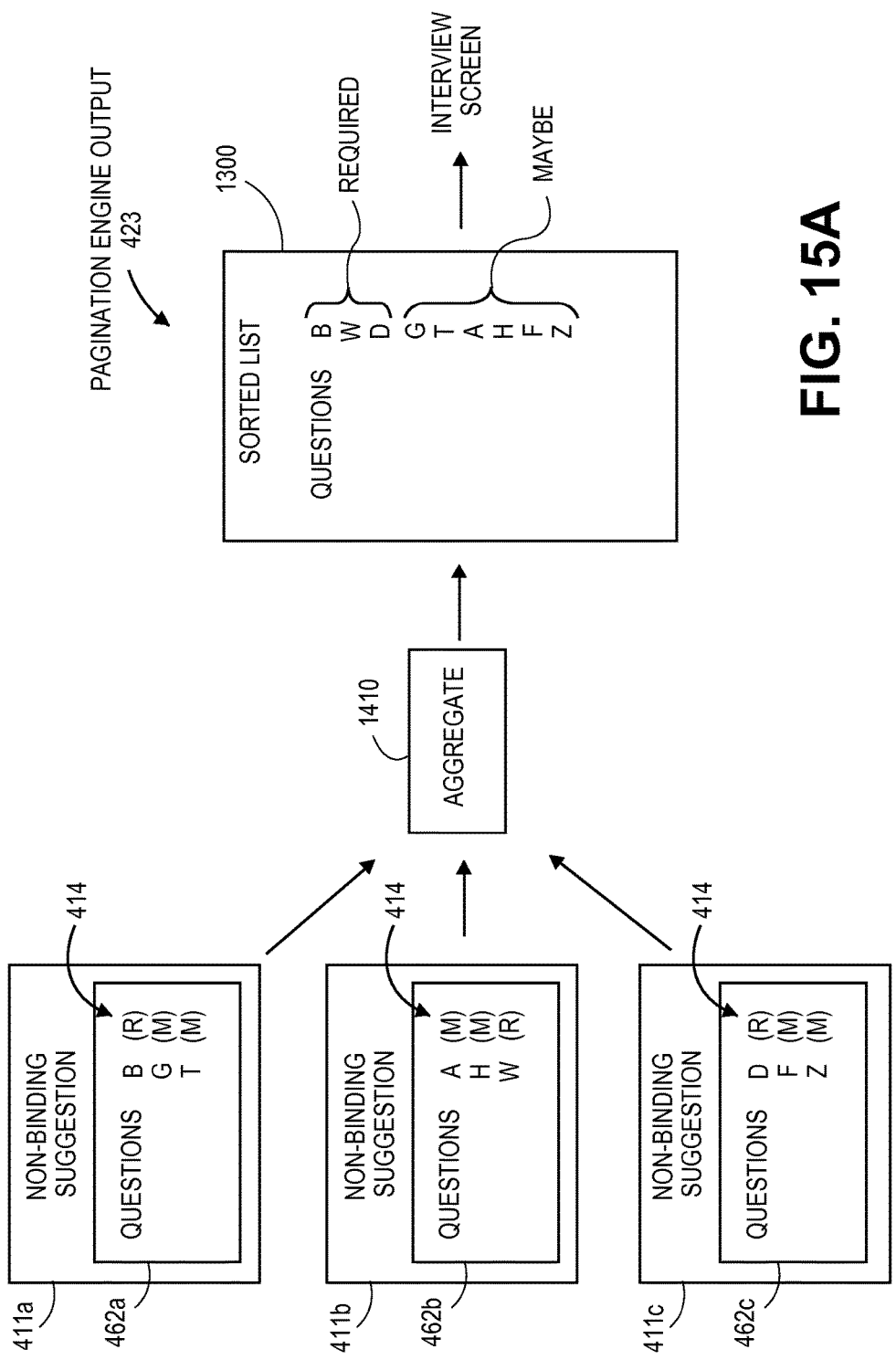
FIG. 15A illustrates one example of how prioritization data in the form of categorization of questions of non-binding suggestions is utilized to generate a pagination structure in the form of a sorted list and how categorized questions or tax topics of non-binding suggestions are integrated within the sorted list.

Referring to FIG. 15A, in another embodiment, tax logic agent 410 may generate non-binding suggestions 411, which may not be ranked, but that include questions or topics 462 and associated question or topic categorizations 417. Continuing with the above example, in which unranked non-binding suggestions 411 include Questions B, G, T, A, H, W, D, F and Z, certain questions such as questions B, W and D, may be "required" questions (identified by "R" in FIG. 15A, or questions 462 that must be answered in order to comply with a tax authority requirement or to satisfy minimum content criteria in order to generate a fileable electronic-tax return, whereas other questions 462 may involve "non-required" questions, which may be referred to as "maybe" questions, "possible" questions, "assumed" questions or "inferred" questions (identified by "M" in FIG. 15A).

For example, non-required questions may be selected based at least in part upon a system component, such as the tax logic agent 410 or UI controller 430 or module thereof, determining inferences or assumptions about the user or questions that may pertain to the user, such as questions G, T, A, H, F and Z. In embodiments involving question categorization 417, pagination engine 420 may construct a sorted list 1400 including, from top to bottom, the following questions in sequence: questions B, W and D categorized as "required" 1510, followed other categories 1512, such as "maybe" or other "non-required" questions G, T, A, H, F and Z. While FIG. 15A illustrates one example of a sequence of each group of "required" and "maybe" questions, the order of "required" questions may differ, e.g., by random selection, in the absence of other question ranking prioritization data 414, such that aggregation 1410 may or may not be needed in embodiments that utilize categorization prioritization data 414.

Figure 15B:
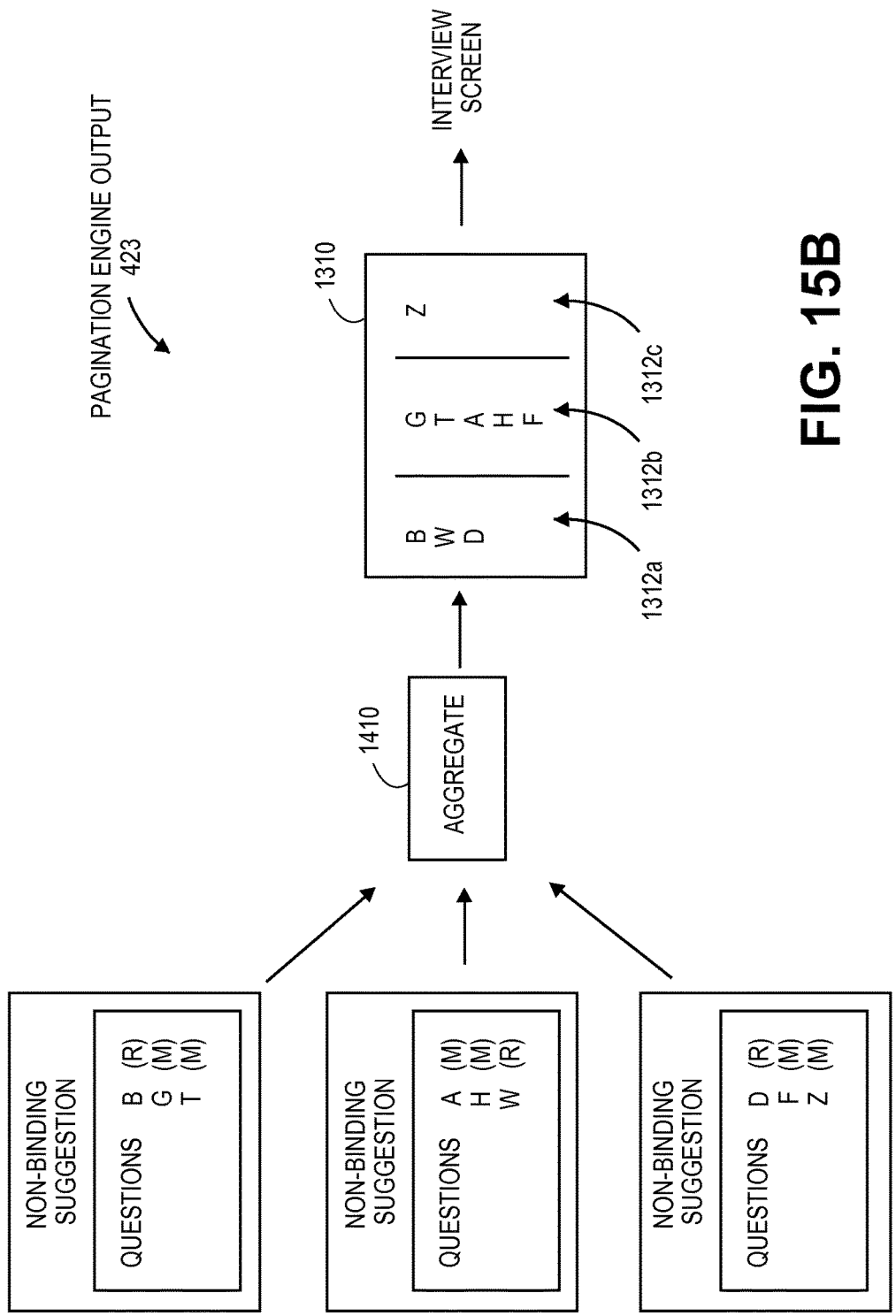
FIG. 15B illustrates one example of how prioritization data in the form of categorization of questions of non-binding suggestions is utilized to generate a pagination structure in the form of an interview screen including a plurality of frames or segments and how categorized questions or tax topics of ranked non-binding suggestions are integrated within the framed or segmented interview screen.

Thus, with embodiments, a sorted list 1400 of questions 462 generated by pagination engine 420 includes "required" 1510 questions first, followed by "non-required" or "maybe" 1512 questions following the "required" 1510 questions. FIG. 15B illustrates how paginated structure including these ranked questions 462 can include a first frame segment 1412*a* including "required" questions B, W and D, followed by a second segment or frame 1412*b* including five "maybe" questions G, T, A, H and F (continuing with the example in which each frame is configured to accommodate a certain maximum number of questions), and as necessary, a third segment or frame 1412*c* frame including other "maybe" questions, question Z (e.g., if each frame or segment accommodates a limited number of questions), or for another category of questions. Further, it will be understood that questions 462 assigned a certain category may be selected from different non-binding suggestions 411 and integrated into a group of other questions 462 having the same categories, or grouped together into a common frame segment 1412. In other words, for example, "required" questions 462 may come from one non-binding suggestion 411 and integrated into a segment of a framed interview screen for these types of questions 462, or "required" questions 462 may come from multiple non-binding suggestions 411 and integrated into a segment for these types of questions 462.

While embodiments may generate a pagination structure based on categorization, the user may not know the basis or reason why certain questions 462 are presented before or after others. In other embodiments, "required" questions, for example, can be emphasized or otherwise indicated to inform the user that these questions are required 1510 as opposed to other questions that may not be required 1512. Question emphasis, in a sorted list 1300 and/or framed 1400 view, may involve presenting the highest priority or required questions in a certain font, color or size, or using some other indicator to emphasis certain questions 462 relative to others.

In embodiments involving ranked non-binding suggestions 411 that include two or more of ranked or scored suggestions 411, ranked or scored questions 462, and question categorizations 417, embodiments can be configured such that certain prioritization data 414 is weighted more heavily than others such that, for example, if a question 462 is categorized the categorization is considered first for determining how to generate a pagination structure, followed by question scoring, followed by suggestion ranking. As another example, in embodiments involving ranked or scored questions and categorization data, embodiments can be configured such that one of these criteria is weighted more heavily than the other.

It will be understood that the examples provided for ease of explanation are provided in a non-limiting manner, and that the prioritization data processed by a pagination engine 420 may involve one or more or all of suggestion 411 ranking or scoring, individual question 462 ranking or scoring, and individual question categorization 417.

Referring again to FIG. 12, at 1210, UI controller 430 generates an interview screen 432 that incorporates questions 462 of non-binding suggestion 411 including pagination or segmentation structure 422 including associated questions 462 as determined by the pagination engine 420, and at 1212, user may select a question 462 from interview screen 432 or submit query to search for question/topic, narrow or filter search results.

Figure 16:
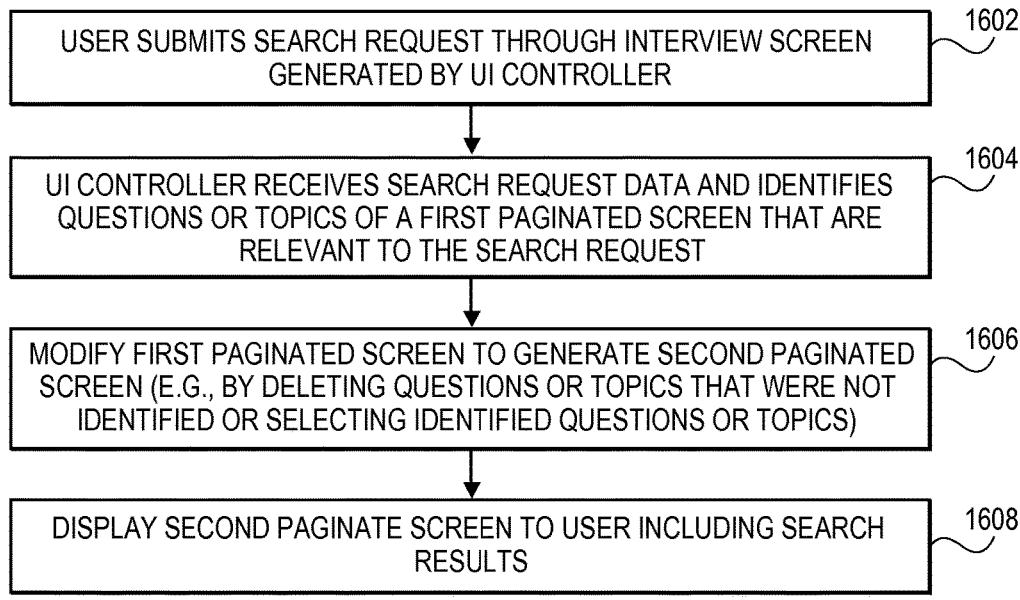
FIG. 16 is a flow diagram illustrating an embodiment in which the user can submit search request in order to filter or focus the questions presented in a paginated interview screen generated according to embodiments.

For example, referring to FIG. 16, at 1602, user can submit a search or filter request through interview screen 432 generated by UI controller 430 that includes questions 462 arranged according to pagination engine output 423, and the results of the search or filter request can also be structured according to the pagination engine output 423. In this regard, embodiments provide search or filter capabilities to enhance how, for example, "required" questions and "maybe" questions are processed and to manage question distributions that may involve substantially more "maybe" questions than "required" questions, particularly at the beginning phases of preparation of the electronic tax return when embodiments operate on less or more limited data compared to later stages of preparation, thus providing an effective method for managing longtail question distribution.

According to one embodiment, this involves the user submitting search criteria in the form of a search based on words or phrases entered by the user into a search field presented within interview screen 432. According to one embodiment, the search may involve a particular tax topic (e.g., "stocks" or "mortgage") or a category of questions (e.g., "required") when the user knows that the user can drill down or search for required questions by typing "required" into the search field. Inn other embodiments, selecting a tab for "required" questions of tabs 1704 for pre-determined search or filter capabilities or selecting a tab for "maybe" questions, to allow the user to select or jump to various types or categories of questions at the user's option. According to one embodiment, the interview screen 432 includes tabs for "required" questions but not tabs for other questions, which may nevertheless be selectable in another section of the paginated interview screen 432. At 1604, UI controller 430 receives search request data and identifies questions 462 of a first paginated screen that are relevant to the search request, and at 1606, modifies the initially presented paginated screen to generate second paginated screen (e.g., by deleting questions or topics that were not identified per the user's search or filter request, or selecting identified questions or topics based on the search or filter request). At 1608, the UI controller displays second paginated screen to the user including search results. Thus, rather than being presented with 100 total questions, 25 of which are categorized as "required" and 75 of which are categorized as "maybe" the user can perform a search by topic, resulting in display of 10 total questions, three of which are categorized as "required" for that topic, and seven of which are "maybe" questions. As another example, the user may select or search for only "required" questions in response to which the UI controller would present the 25 required questions but not the 75 "maybe' questions." Embodiments also allow the user to submit a search for category and by topic, such as "required" and "stock" such that the UI controller may return two required questions related to "stock" and six "maybe" questions related to "stock" in response to the search request. The UI controller 430 presents these results while maintaining the applicable pagination structure, e.g., in a framed view, the interview screen 432 generated based on the pagination engine output 423 may include a first frame or segment 1412a for the two "required stock" questions 462, and a second frame or segment 1412b for the six "maybe stock" questions 462.

Referring again to FIG. 12, at 1214, the user responds to question/topic selected or presented, with an answer, and at 1216, UI controller 430 receives the response and writes the response data to shared data store 440 to update runtime/instance data 442.

Figure 17:
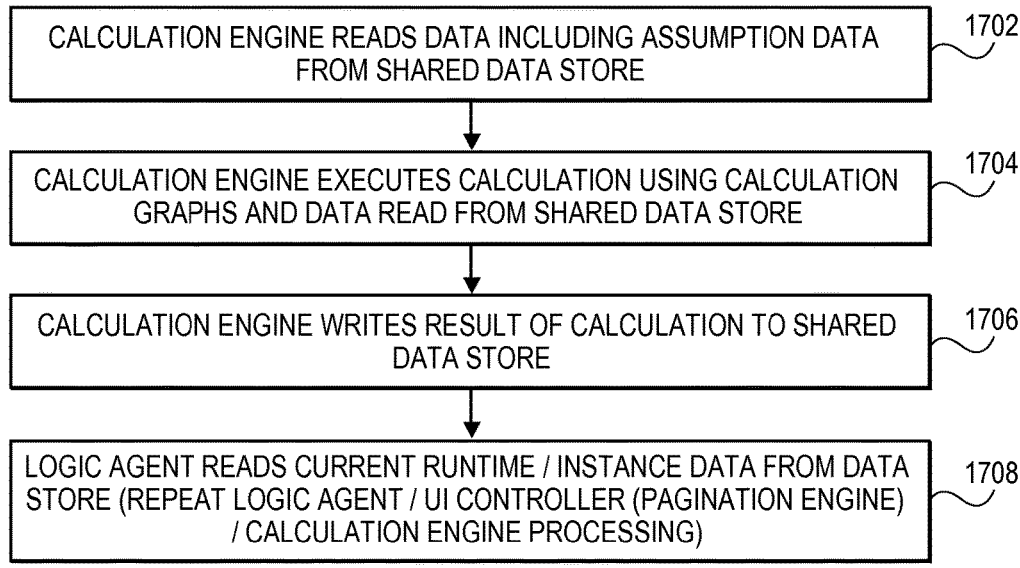
FIG. 17 is a flow diagram illustrating calculation engine processing of runtime data including a result generated by the user interface controller processing non-binding suggestions generated according to embodiments.

Referring to FIG. 17, at 1702, calculation engine 450 reads runtime data 442 from shared data store 440, and at 1704, executes a calculation using calculation graphs 482. At 1706, the calculation engine 450 writes result of calculation to shared data store 440.

Figure 18:
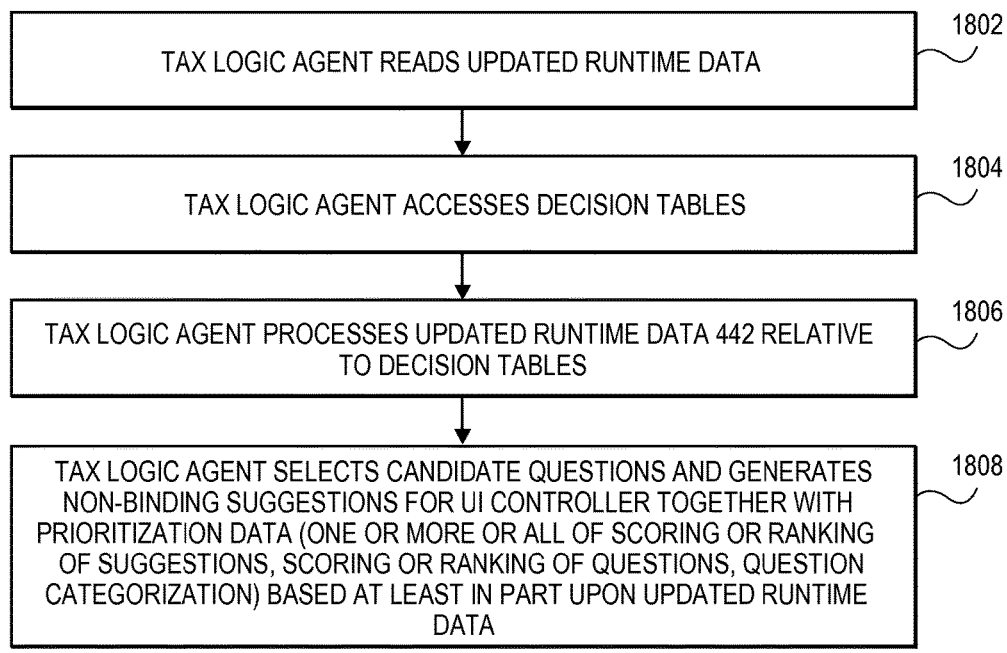
FIG. 18 is a flow diagram illustrating logic agent processing that occurs after processing by the user interface controller and calculation engine.

Referring to FIG. 18, at 1802, tax logic agent 410 reads runtime data 442 from shared data store 440, at 1804, tax logic agent 410 accesses decision tables 460, and at 1806, processes runtime data 442 to determine which answers to questions 462 of decision tables 460 are known and which ones remain unanswered, whether a conclusion or status of completeness for a tax topic can be determined, and if not, which rules 461 remain as the active rules 461. At 1808, tax logic agent 410 selects candidate questions 462 and generates non-binding suggestions 411 for UI controller 430, together with prioritization data 414, which may involve ranking of suggestions 411, ranking of questions 462 and/or question categorization. These iterations repeat for a decision table 460 until a conclusion is reached or all of the required inputs for a rule 461 are known in order to reach a state of completeness for the tax topic that is the subject of that decision table 460.

Iterations of processing by pagination engine 420 of prioritization data 414 of non-binding suggestions 411 are executed to generate respective paginated interview screens 432 with respective pagination structures as runtime data 442 is updated or changed, resulting in, for example, questions that were previously "maybe' questions now being "required" questions, or vice versa, questions that were previously identified no longer being relevant, and questions that were previously considered not relevant now being "required" or "maybe" questions as a result of runtime data 442 changes. Tax logic agent 410 reads the updated or changed runtime data 442 periodically, or as runtime data 442 is changed, and subsequently generates other non-binding suggestions 411 with respective suggestion ranking or scoring, question ranking or scoring and/or question categorization data. Thus, pagination structure and/or content thereof, sorted or segmented based on one or more scores, rankings or categories, are dynamically modified as the user enters, changes, deletes or imports data and that data is written to or read from the shared data store 440, and as these changes occur, corresponding updates to resulting pagination structures are also generated and presented to the user.

When all of the data has been received for the required calculations to complete the tax return, the tax return is ready to be filed. For example, as noted above, tax logic agent 110 may determine that all of the conditions of the completeness graph 465 have been satisfied such that a "fileable" tax return can be prepared with existing runtime data 442 or the electronic tax return has been completed and is ready to be filed. When the electronic tax return is populated and completed by tax logic agent 410 or by the direction of tax logic agent 410 or using one or more components or services 470 as applicable, the electronic tax return can be printed and/or filed with a tax authority such federal state or local tax authority or other tax collecting entity such as Internal Revenue Service and Franchise Tax Board of the State of California.

Other embodiments described with reference to FIG. 19-24, various aspects of which are described above, and which may be executed together with or independently of embodiments described above, and which may be executed by or involve various system components described above, relate to how questions are ranked and subsequently integrated into an interview screen presented to the user of the tax return preparation application.

Figure 19:
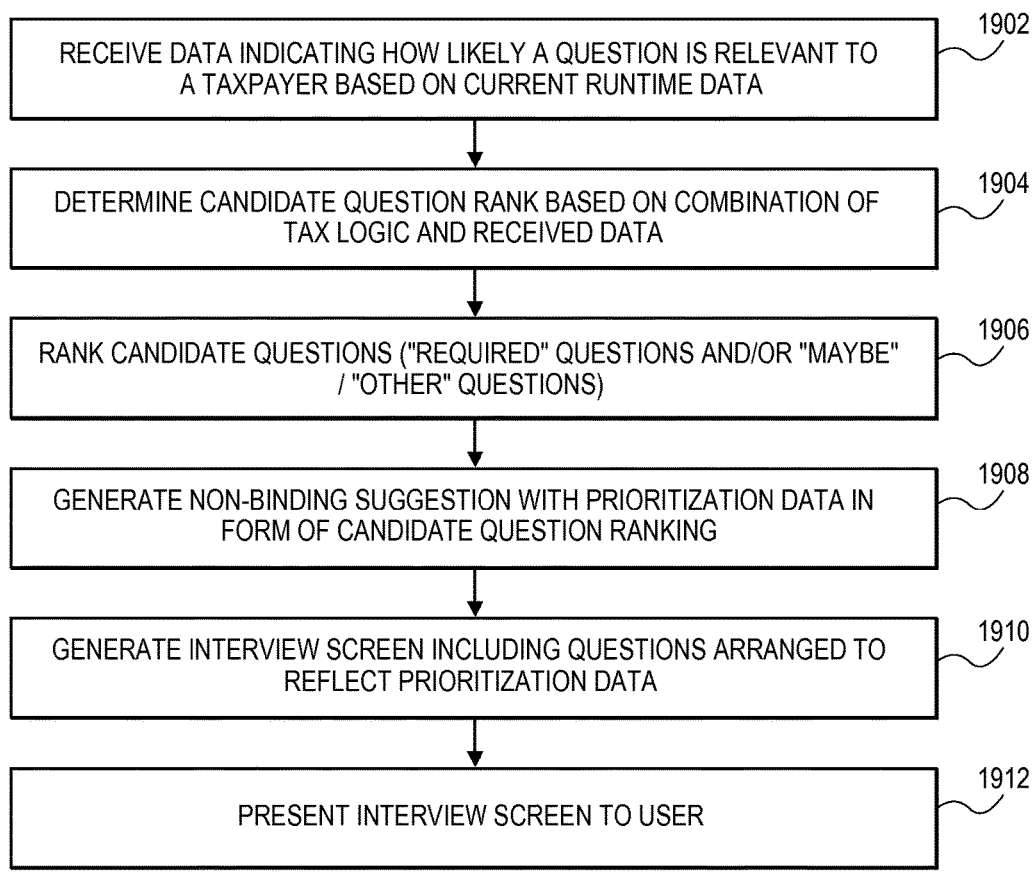
FIG. 19 is a flow diagram of an embodiment that considers a combination of tax logic data and data indicating how likely a question or topic is relevant to a user.

Referring to FIG. 19, in a method according to one embodiment, at 1902, data indicating how likely a question is relevant to a taxpayer based on current runtime data is received, and at 1904, scores or rankings of candidate questions are determined based on combination of tax logic and received likelihood data. At 1906, questions (which may be "required" questions and/or "maybe"/"other' questions), are ranked based on the combination of ranking criteria, and at 1908, a non-binding suggestion is generated including prioritization data in form of candidate question ranking. At 1910, an interview screen including questions arranged to reflect prioritization data is generated, and presented to the user at 1912.

Figure 20:
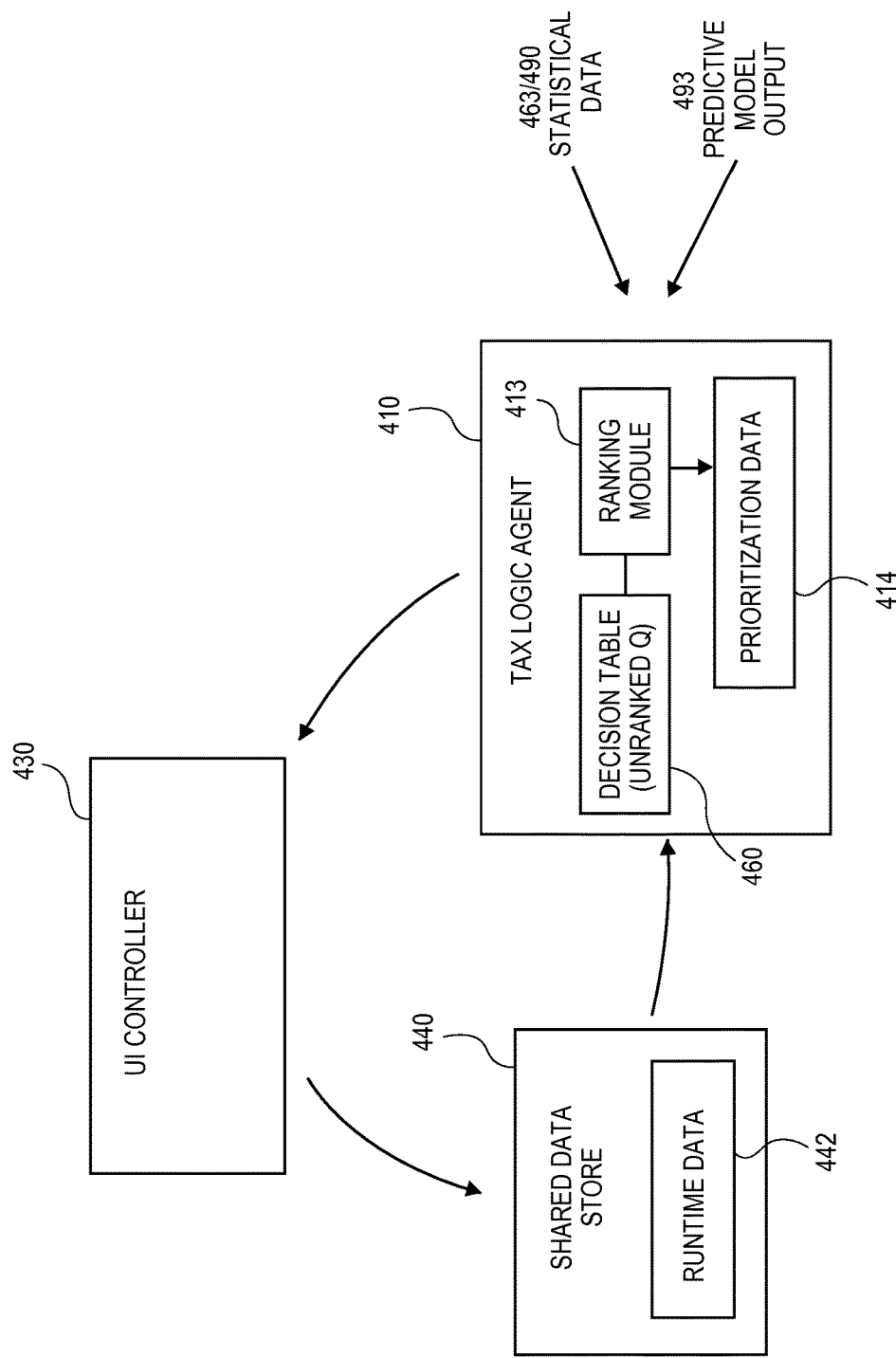
FIG. 20 is a block diagram of a computerized system constructed according embodiments for generating prioritization data in the form of question ranking or scores for different types or categories of candidate questions based at least in part upon a combination of tax logic and data indicative of how likely a topic is relevant to a user.

As generally illustrated in FIG. 20, embodiments may be executed by or involve various system components that are described above, e.g., one or more of ranking module 414, inference module 416 for identifying questions that "may be" relative to the user based at least in part upon the current runtime data 442, and data sources that are indicative of a likelihood or probability that a question or topic is relevant to a user such as statistical data 463/490 and predictive models 493. For ease of explanation and illustration, reference is made generally to actions performed by tax logic agent 410 and UI controller 430.

Figure 21:
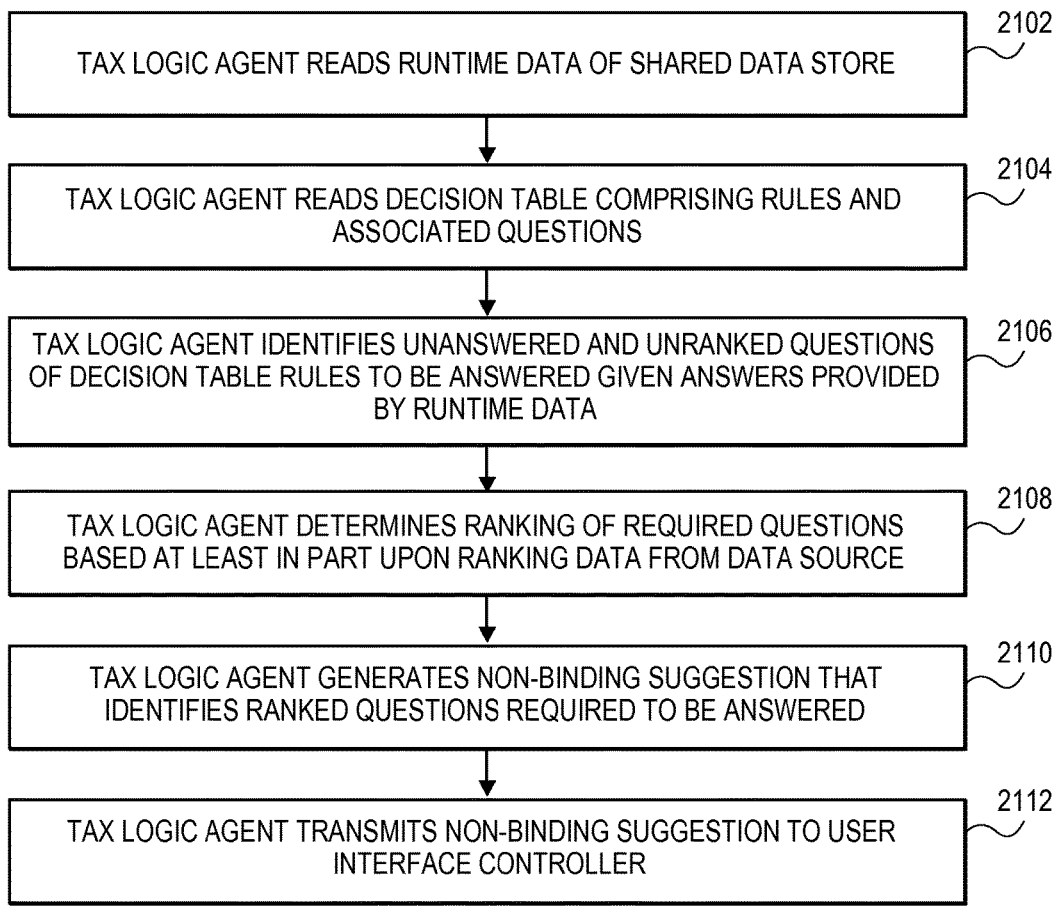
FIG. 21 is a flow diagram of one embodiment of a computer-implemented method executed by a tax logic agent for generating non-binding suggestions including ranking data of required questions.
Figure 22:
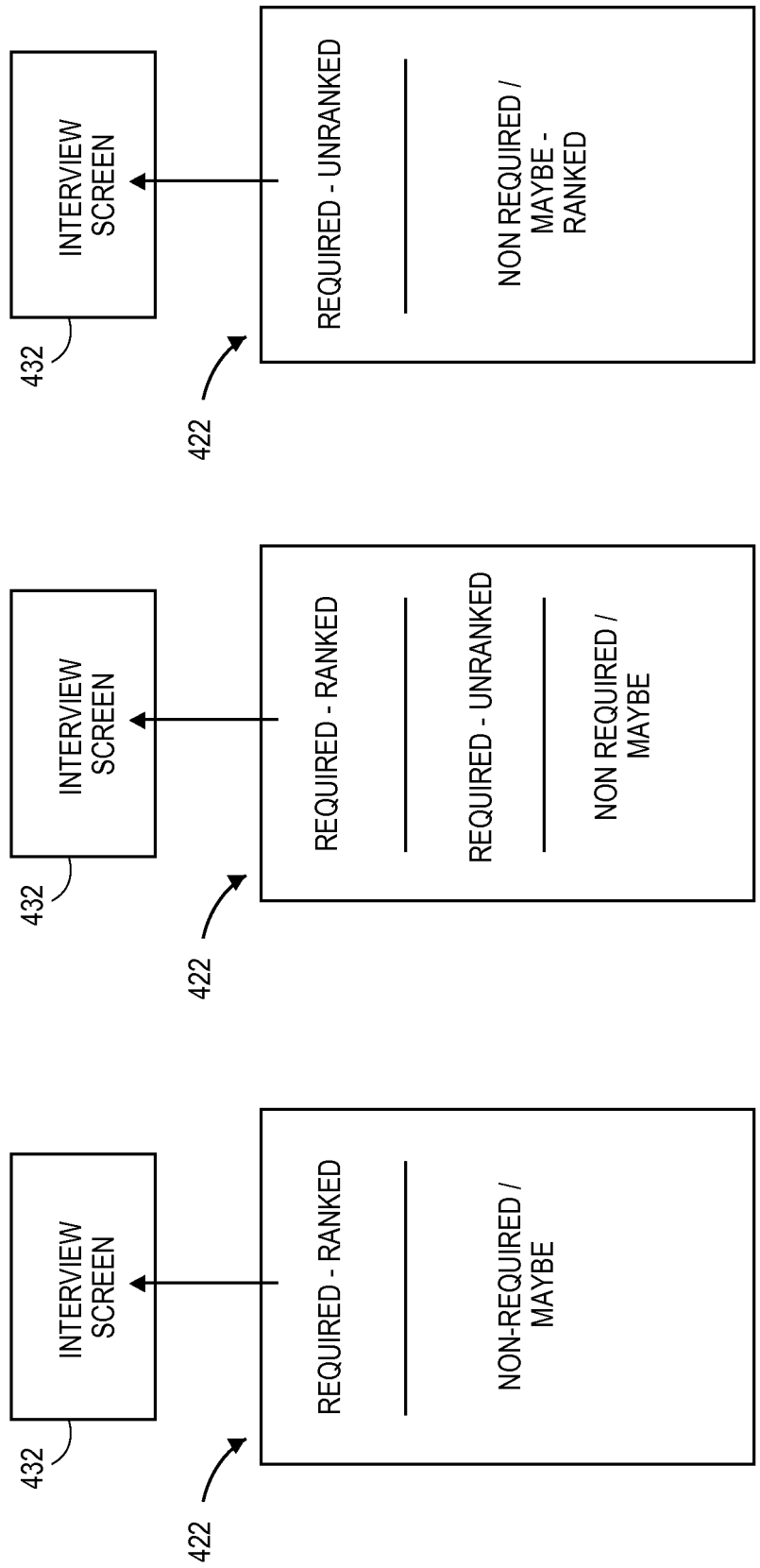
FIGS. 22A-C illustrates how embodiments may be applied, FIG. 22A illustrating how required questions can be ranked and arranged relative to non-required questions in an interview screen, FIG. 22B illustrating how certain required questions can be ranked and arranged relative to non-required questions in an interview screen, FIG. 22C illustrating how non-required questions can be ranked and arranged relative to unranked, required questions in an interview screen.

Referring to FIG. 21, in a method performed by tax logic agent 410, at 2102, the tax logic agent 410 reads runtime data 442 of shared data store 440, and at 2104, accesses or reads decision table 460 comprising rules 461 and associated questions 462. At 2106, tax logic agent 410 identifies unranked questions of active decision table rules that remain unanswered in view of the current runtime data 442 or, in other words, rules 461 that still require at least one condition, in the form of a runtime data 442 answer, to be satisfied before a determination can be made about the topic that is the subject of the decision table 460. Decision tables 460 utilized by embodiments, e.g., as shown in FIGS. 4A-B and 9A-B identify various questions 462 applicable to respective rules 461 but the decision table questions are not ranked within the decision table 460. At 2108, tax logic agent 410 determines ranking of required questions based at least in part upon ranking data from data source.

According to one embodiment, as shown in FIGS. 4A-B and 9A, the ranking data is statistical data 463/490 that is used to infer question that may be relevant to the user based on the current runtime data 442. As noted above, using statistical data, an inference may be made that if the user lives in a certain zip code as reflected in the current runtime data 442, then statistical data may indicate that the user likely owns a home, has property tax deductions, and mortgage interest deductions. According to another embodiment, instead of or in addition to using statistical data 463/490, ranking data is data generated by the tax logic agent 410 executing a predictive model 493, examples of which are noted above. At 2110, tax logic agent 410 generates non-binding suggestion 411 that includes prioritization data 414 identifying ranked questions required to be answered, and at 2112, the non-binding suggestion 411 is transmitted to the UI controller 430.

According to one embodiment, only questions 462 that are determined or categorized as being "required" since they were selected from or originated from the decision table 460 are ranked, whereas other "non-required" questions, such as questions that are determined by making inferences or assumptions about what topics pertain to the user, are not ranked. There may be instances in which all of the required questions are ranked, and other instances in which some or subsets of required questions are ranked.

Referring to FIGS. 22A-B, in embodiments in which required questions are ranked, when these questions are integrated into an interview screen 432, e.g., based on a pagination structure 422, ranked required questions are prioritized relative to other non-required questions. As shown in FIG. 22A, when a pagination structure 422 in the form of a sorted list is utilized, required questions, all of which are ranked, are presented at the top of a sorted list, and in a sequence according to the ranking, whereas non-required, inferred or "maybe' questions begin after the ranked required questions. As shown in FIG. 22B, there may be instances in when only some of the required decision table questions are ranked. In these cases, the interview screen is structured such that ranked required questions are prioritized, followed by the remaining unranked required questions (e.g., in a sequence in which they appear in the decision table or in a randomly selected sequence selected by ranking module 413), followed by unranked and non-required, inferred or "maybe" questions.

Referring to FIG. 22C, in other embodiments, required questions of the decision table 460 are not ranked by ranking module 413, and instead, non-required, inferred or "maybe' questions are ranked based on the ranking data such as statistical data 463/490 or an output generated by tax logic agent 410 executing a predictive model 493 and integrated into an interview screen 432, e.g., based on a pagination structure 422, ranked required questions are prioritized relative to other non-required questions. As shown in FIG. 22C, when a pagination structure 422, e.g., in the form of a sorted list is utilized, unranked required questions are presented at the top of the sorted list (e.g., in a sequence in which they appear in decision table 460 or in a randomly selected sequence selected by ranking module 413), followed by ranked and non-required, inferred or maybe questions that are arranged in a sequence according to the ranking.

Other embodiments may involve a combination of embodiments shown in FIGS. 22A-C, i.e., using statistical data 463/490 and/or predictive models 493 to determine scores or rankings of required questions and non-required, inferred or "maybe" questions, and generating an interview screen 432 that incorporates respective rankings of questions of respective categories.

Figure 23:
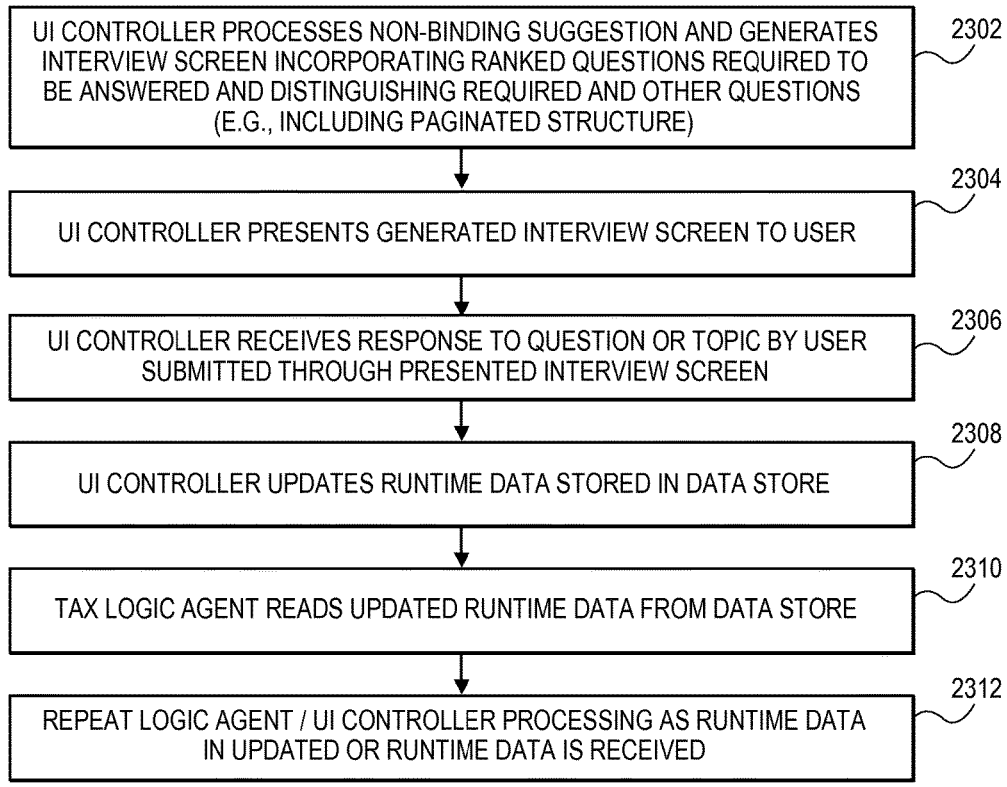
FIG. 23 is a flow diagram of one embodiment of a computer-implemented method executed by a user interface controller and illustrating how question ranking is dynamic based on iterations of actions performed by the user interface controller and tax logic agent.

Referring to FIG. 23, after the ranking/prioritization data 414 has been determined and non-binding suggestions 411 incorporating same are generated and transmitted to the UI controller 430, at 2302, UI controller 430 processes non-binding suggestions, and for the non-binding suggestions 411 that are selected for processing, UI controller 430 generates interview screen 432 that incorporates ranked the prioritization data 414 in the form of question ranking or scoring, and required questions, whether unranked per the decision table 460 or ranked, are distinguished from other questions by various structural or visual indicators, such as position within an arrangement of questions of a paginated structure 422, color, font, or other indicator.

Figure 24:
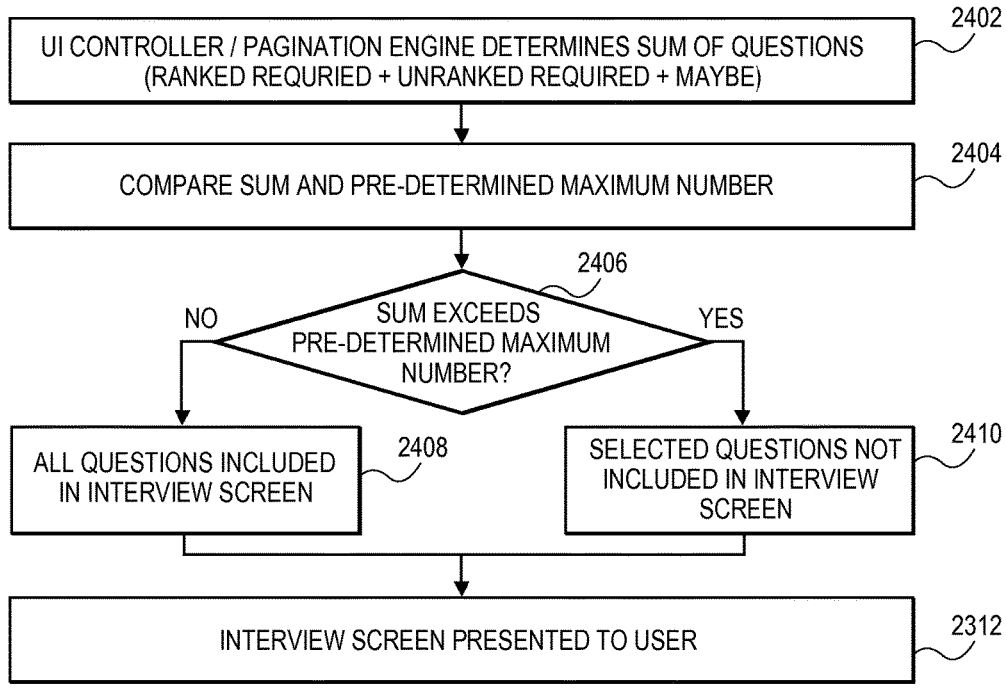
FIG. 24 is a flow diagram of one embodiment of a computer-implemented method executed by a user interface controller for determining whether to include all or selected questions of a non-binding suggestion in an interview screen.

Referring to FIG. 24 if necessary, UI controller 430 may reduce the number of questions integrated into an interview screen 432, which may be performed to include a more manageable number of questions, e.g., at the beginning of the preparation process when more questions remain unanswered, or to accommodate a form factor of a computing device executing the tax return preparation application (e.g., a computing device with a large screen or a mobile communication device with a smaller screen). At 2402, UI controller 430, or paginated engine 420 thereof, determines a sum or total of questions to be presented within the interview screen 432 (ranked required questions+unranked required questions+"maybe" questions), and at 2404, UI controller compares the determined sum and a pre-determined maximum number, which may, for example, depend on the type of computing device or display utilized, or depending on the stage of preparation. At 2406, when it is determined by the UI controller 430 that the determined sum does not exceed the pre-determined maximum number, then no adjustment to the number of questions is needed and all questions that are the subject of the processed non-binding suggestions are integrated into interview screen 432 that is presented to the user at 2412. Otherwise, at 2410, when the sum exceeds the pre-determined maximum number, then questions of non-binding suggestions 411 are selected to not be included in interview screen 432, and at 2512, interview screen 432 including modified question content is generated and presented to user.

Referring again to FIG. 23, at 2304, UI controller 430 presents generated interview screen to user, and at 2306, user responds to the presented question and UI controller 430 receives the user's response submitted through presented interview screen 432. At 2308, UI controller 430 updates runtime data 442 stored in shared data store 440, and after calculation engine 480 reads runtime data 442 and updates runtime data to include any calculation result, tax logic agent 410 reads updated runtime data 442 from data store 440 including the new or modified data provided by user and any result of a calculation. At 2312, iterations of tax logic agent 410 and UI controller 430 processing described above are repeated as runtime data 442 is updated/additional runtime received.

As a result of iterations of ranking required and/or non-required questions, receiving user responses, and performing calculations, resulting in updates to runtime data 242, runtime data read by the tax logic agent 410 and determinations regarding questions that remain unanswered in view of runtime data 442 are dynamic, resulting in dynamic question scoring or ranking by tax logic agent 410. For example, a question that was initially categorized as "required" based on first runtime data 442$a$ may subsequently be re-categorized as "non-required" as a result of second runtime data 442$b$ that differs from first runtime data 442$a$. As another example, a question that was initially categorized as "inferred" or "maybe" based on first runtime data 442$a$ may subsequently be re-categorized as "required" as a result of second runtime data 442$b$ that differs from first runtime data 442$a$. As yet another example, a question that was not previously identified based on first runtime data 442$a$ may subsequently be identified and categorized as "required" as a result of second runtime data 442$b$ that differs from first runtime data 442$a$.

Figure 25:
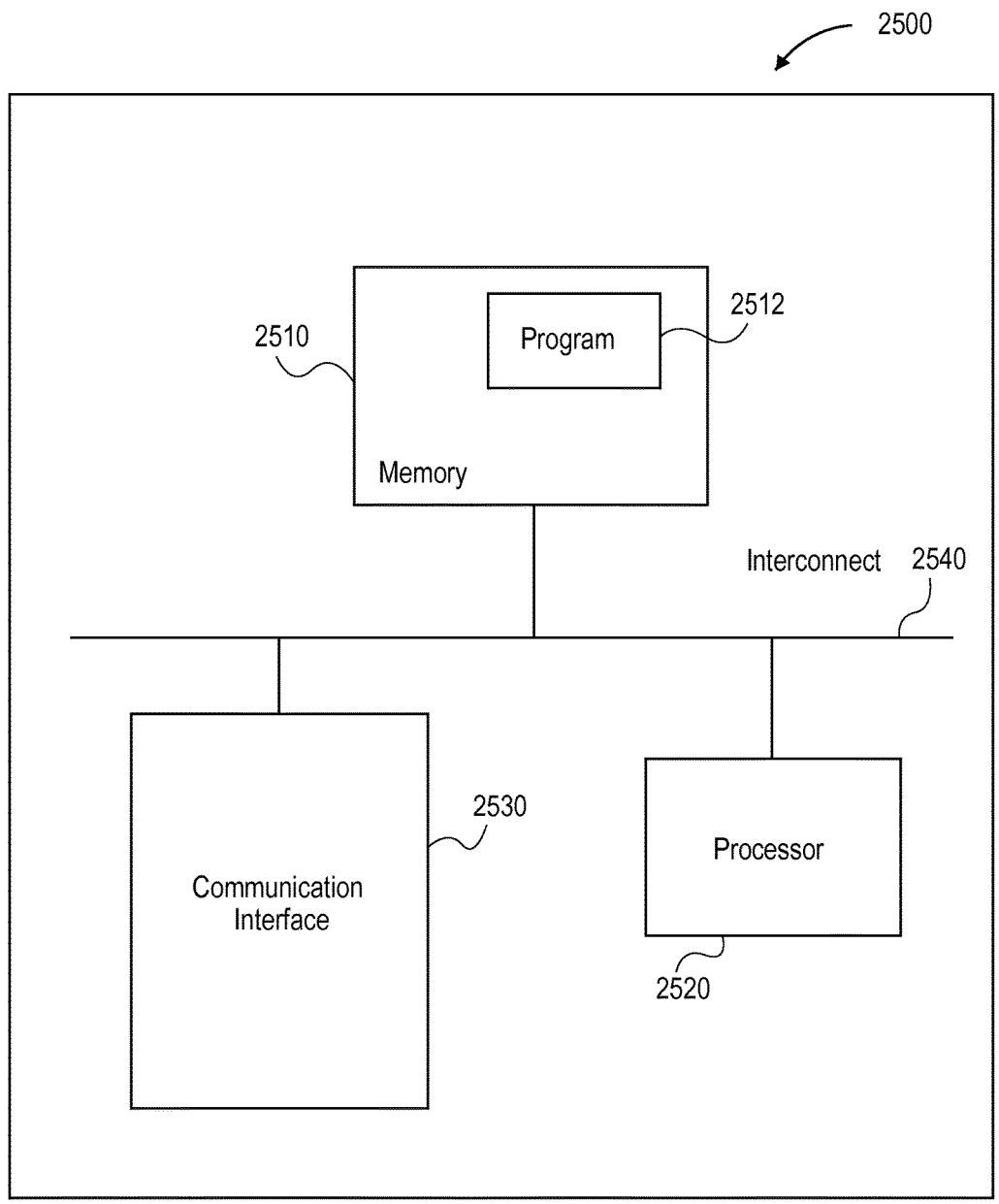
FIG. 25 is a block diagram of components of a computer system that may be programmed or configured to execute embodiments.

FIG. 25 generally illustrates certain components of a computing device 2500 that may be utilized to execute or that may embody components of embodiments. For example, the computing device may include a memory 2510, program instructions 2512, a processor or controller 2520 to execute instructions 2512, a network or communications interface 2530, e.g., for communications with a network or interconnect 2540 between such components. The memory 2510 may be or include one or more of cache, RAM, ROM, SRAM, DRAM, RDRAM, EEPROM and other types of volatile or non-volatile memory capable of storing data. The processor unit 2520 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2540 may include a system bus, LDT, PCI, ISA, or other types of buses, and the communications or network interface may, for example, be an Ethernet interface, a Frame Relay interface, or other interface. The network interface 2530 may be configured to enable a system component to communicate with other system components across a network which may be a wireless or various other networks. It should be noted that one or more components of computing device 2500 may be located remotely and accessed via a network. Accordingly, the system configuration provided in FIG. 25 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2520 performs steps or executes program instructions 2512 within memory 2510 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while various types of prioritization data or criteria are described for ranking suggestions, ranking questions or categorizing questions, it will be understood that such criteria may be used individually or embodiments may involve use of multiple types of prioritization criteria, and various weights or emphasis may be applied to multiple types of prioritization data.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method performed by a computing device comprising a data store including computer-executable instructions of a computerized tax return preparation application and a processor executing the computer-executable instructions of the computerized tax return preparation application, the computer-implemented method comprising:

the computing device, by executing a rule-based logic agent, reading first runtime data of an electronic tax return from a shared data store, selecting candidate topics or questions from a data structure comprising a plurality of rows defining respective rules and a plurality of columns defining respective questions, generating a plurality of non-binding suggestions of candidate topics or questions to be presented to the user based at least in part upon the first runtime data and the data structure, and generating prioritization data associated with the plurality of non-binding suggestions;

the computing device, by executing a user interface controller in communication with the rule-based logic agent, receiving the plurality of non-binding suggestions from the rule-based logic agent;

the computing device, by executing a pagination engine associated with the user interface controller, receiving prioritization data generated by the rule-based logic agent and associated with the plurality of non-binding suggestions, and generating an output based at least in part upon the prioritization data;

the computing device, by executing the user interface controller, generating an interview screen that is presented to the user through a display of the computing device, the interview screen comprising a first paginated screen including topics or questions of at least one selected non-binding suggestion generated by the rule-based logic agent and structured based at least in part upon the pagination engine outputs;

the computing device, by executing the user interface controller, receiving user input through the first paginated screen, the user input corresponding to selection of a topic or question of the first paginated screen, and writing the response to the shared data store shared with the rule-based logic agent to update the first runtime data and generate second runtime data; and the computing device, by executing a calculation engine, reading the second runtime data from the shared data store, determining a calculation result based on performing a calculation using the second runtime data, and writing the calculation result to the shared data store to update the second runtime data and generate third runtime data.

2. The computer-implemented method of claim 1, further comprising:

the computing device, by executing the rule-based logic agent, reading the third runtime data of the electronic tax return from the shared data store, selecting candidate topics or questions based at least in part upon the second runtime data, and generating a second plurality of non-binding suggestions of candidate topics or questions to be presented to the user; and the computing device, by executing the user interface controller, receiving the second plurality of non-binding suggestions generated by the rule-based logic agent;

the computing device, by executing a pagination engine, receiving second prioritization data generated by the rule-based logic agent and associated with the second plurality of non-binding suggestions, and generating a second output based at least in part upon the second prioritization data;

the computing device, by executing the user interface controller generating a second interview screen that is presented to the user through the display of the computing device, the second interview screen comprising a second paginated screen including topics or questions of at least one non-binding suggestion of the second plurality of non-binding suggestions and structured based at least in part upon the second pagination engine output, receiving second user input through the second paginated screen, the second user input corresponding to selection of a second topic or question of the second paginated screen and providing a second response to the second selected topic or question, and writing the second response to the shared data store to update the third runtime data and generate fourth runtime data.

3. The method of claim 2, the first paginated screen and the second paginated screen each comprising the same pagination structure with different question and topic content.

4. The method of claim 2, the first paginated screen and the second paginated screen each comprising a sorted list, respective sorted lists including different question or topic content.

5. The method of claim 2, the first paginated screen and the second paginated screen each comprising a plurality of frames or segments, respective frames or segments comprising different questions or topic content.

6. The method of claim 1, the pagination structure being utilized by the user interface controller in response to user input selecting an element of the pagination screen.

7. The method of claim 2, the first paginated screen and the second paginated screen comprising different pagination structures.

8. The method of claim 7, the first paginated screen comprising a sorted list of questions or topics, and the second paginated screen comprising a plurality of frames or segments comprising respective questions or topics.

9. The method of claim 1, further comprising the computer, by executing the user interface controller:

receiving user input to toggle between the currently displayed first paginated screen having a first pagination structure and second paginated screen including the same topics or questions in a different, second pagination structure;

generating the second paginated screen including the same topics or question in the different, second pagination structure; and presenting the second paginated screen to the user through the display, wherein the user responds to or provides data for a selected question or topic when viewing either of the first or second paginated screens.

10. The method of claim 1, the prioritization data comprising non-binding suggestion ranking data.

11. The method of claim 10, ranking of non-binding suggestions being based at least in part upon respective categories of respective candidate questions of respective non-binding suggestions.

12. The method of claim 11, a non-binding suggestion comprising a candidate question or topic that is required to be answered or addressed is ranked higher than other non-binding suggestions that do not include a candidate question that is required or answered to be addressed.

13. The method of claim 1, a non-binding suggestion comprising a candidate question or topic that was identified by the rule-based logic agent based upon an inference about the user by the rule-based logic agent in view of the current runtime data and data from a source external of the electronic tax return is ranked higher than other non-binding suggestions that do not include a candidate question identified based at least in part upon an inference about the user.

14. The method of claim 13, wherein non-binding suggestions are ranked based at least in part upon a number of inferences or assumptions that were determined by the rule-based logic agent in order to identify a candidate question that is in a non-binding suggestion.

15. The method of claim 10, wherein non-binding suggestions are ranked based at least in part a number of rules of the data structure that remain active when candidate questions involving the data structure are answered.

16. The method of claim 10, wherein non-binding suggestions are ranked based at least in part a number of questions of a rule of the decision table that would remain unanswered when candidate questions involving the rule are answered.

17. The method of claim 1, the prioritization data comprising ranking data of individual candidate questions.

18. The method of claim 17, wherein ranking of individual candidate questions is based at least in part upon an estimated probability of how a question will be answered.

19. The method of claim 17, wherein ranking of individual candidate questions is based at least in part upon how a possible answer to the individual candidate question would eliminate other questions of the data structure utilized by the rule-based logic agent from consideration.

20. The method of claim 1, the prioritization data comprising a category of a candidate question of a non-binding suggestion.

21. The method of claim 20, wherein the candidate question is categorized as one of multiple categories comprising:
   a first category of a question or topic is required to be answered or addressed in order for the electronic tax return to be completed or to satisfy a tax authority requirement; and
   a second category of a question or topic is inferred to be required to be answered or addressed based at least in part upon current runtime data and statistical data.

22. The method of claim 20, wherein the candidate question is categorized as one of multiple categories comprising:
   a first category of a question or topic is required to be answered or addressed in order for the electronic tax return to be completed; and
   a second category of a question or topic is inferred to be required to be answered or addressed based at least in part upon current runtime data and a result generated by the rule-based logic agent executing a predictive model.

23. The method of claim 20, further comprising the rule-based logic agent categorizing candidate questions.

24. The method of claim 20, wherein the categories are based at least in part upon the rule-based logic agent determining respective probabilities based at least in part upon statistical data of other taxpayers.

25. The method of claim 20, wherein the categories are based at least in part upon the rule-based logic agent executing predictive models involving the current runtime data read by the rule-based logic agent.

26. The method of claim 1, the prioritization data comprising multiple variables representative of relative relevance of a question or topic based at least in part upon the fourth runtime data read by the rule-based logic agent.

27. The method of claim 26, the prioritization data comprising:
   ranking data, wherein each question or topic is assigned a ranking or score; and
   categorization data, wherein each question or topic is assigned a category from a plurality of categories.

28. The method of claim 27, the first paginated screen being structured based at least in part upon ranking data taking priority over categorization data.

29. The method of claim 27, the first paginated screen being structured based at least in part upon categorization data taking priority over ranking data.

30. The method of claim 27, wherein the first paginated screen is structured such that groups of questions of a pre-determined category are sorted according to respective rankings.

31. The method of claim 27, wherein the ranking data and the categorization data are not presented to the user through the interview screen.

32. The method of claim 27, the first paginated screen comprising a sorted list of questions or topics of a determined sequence based at least in part upon ranking and categorization data, a first section of the sorted list comprising ranked questions or topics of a first category, and a second section of the sorted list comprising ranked questions or topics of a second category.

33. The method of claim 32, wherein a question or topic can be is selected from the sorted list and answered by the user independently of a presented sequence of questions or topics of the first paginated screen.

34. The method of claim 32, wherein the first paginated screen is structured for scrolling through questions or topics of the sorted list and selecting any presented question or topic of any ranking or category to answer or address.

35. The method of claim 32, the user selecting and answering a question of the sorted list, the method further comprising the pagination engine
   receiving second prioritization data and generating a second output based at least in part upon the second prioritization data,
   the user interface controller generating or selecting a second interview screen, the second interview screen being presented to the user through the display of the computing device and comprising a second sorted list of questions or topics displayed to the user and arranged in a second sequence different than the first sequence based at least in part upon the second output of the pagination engine.

36. The method of claim 32, the user interface controller automatically modifying the sorted list based at least in part upon new or updated runtime data by at least one of deleting a question or topic from the sorted list, adding a question or topic to the sorted list, or changing the sequence of questions or topics of the sorted list, or changing a position of a question or topic within the sorted list.

37. The method of claim 27, the first paginated screen comprising a plurality of frames, a first frame comprising ranked questions or topics of a first category, and a second section of the sorted list comprising ranked questions or topics of a second category.

38. The method of claim 37, wherein the first paginated screen is structured for user navigation to any frame, scrolling through respective questions or topics within respective frames and selecting any presented question or topic of any frame to answer or address.

39. The method of claim 38, the first paginated screen comprising a plurality of frames being automatically modified by the user interface controller based at least in part upon new or updated runtime data by at least one of deleting a question or topic from a frame, adding a question or topic to a frame, adding a frame and a question or topic to the added frame, deleting a frame and a question or topic within the deleted frame, moving a question from a first frame to a second frame.

40. The method of claim 37, a first frame comprising questions or topics required to be answered before filing of the electronic tax return, and a second frame comprising questions or topics that may be required to be answered based at least in part upon the first runtime data.

41. The method of claim 1, further comprising the user interface controller:
- receiving data of a search request submitted by the user through the first paginated screen generated by the user interface controller;
- identifying questions or topics of the first paginated screen that are relevant to the search request, the identified questions or topics being a subset of the questions or topics of the first paginated screen; and
- modifying the first paginated screen to generate a second paginated screen comprising the identified questions or topics; and
- displaying the second paginated screen to the user.

42. The method of claim 41, the user interface controller receiving data of the search request resulting from the user selecting a tab of the first paginated screen corresponding to a category, wherein the second paginated screen includes only questions or topics of the category of the selected tab.

\* \* \* \* \*